United States Patent
Wu et al.

(10) Patent No.: US 11,301,605 B2
(45) Date of Patent: Apr. 12, 2022

(54) SYSTEM AND METHOD OF PROTOTYPING VIRTUAL CIRCUITS WITH PHYSICAL PROXIES

(71) Applicant: Trustees of Dartmouth College, Hanover, NH (US)

(72) Inventors: Te-Yen Wu, Norwich, VT (US); Jun Gong, West Lebanon, NH (US); Alemayehu Seyed, Calgary (CA); Xing-Dong Yang, Hanover, NH (US)

(73) Assignee: Trustees of Dartmouth College, Hanover, NH (US)

( * ) Notice: Subject to any disclaimer, the term of this patent is extended or adjusted under 35 U.S.C. 154(b) by 0 days.

(21) Appl. No.: 17/072,763

(22) Filed: Oct. 16, 2020

(65) Prior Publication Data

US 2021/0117600 A1 Apr. 22, 2021

Related U.S. Application Data

(60) Provisional application No. 62/916,969, filed on Oct. 18, 2019.

(51) Int. Cl.
*G06F 30/30* (2020.01)
*G06F 30/367* (2020.01)
*G06F 30/3308* (2020.01)
*G06F 30/31* (2020.01)
*G06F 115/12* (2020.01)

(52) U.S. Cl.
CPC .............. *G06F 30/30* (2020.01); *G06F 30/31* (2020.01); *G06F 30/3308* (2020.01); *G06F 30/367* (2020.01); *G06F 2115/12* (2020.01)

(58) Field of Classification Search
None
See application file for complete search history.

(56) References Cited

PUBLICATIONS

S. Greenberg et al., "Phidgets: Easy Development of Physical Interface through Physical Widgets," UIST '01, ACM 2001, pp. 209-218. (Year: 2001).*
M. Tawfik et al., "Virtual Instrument Systems in Reality (VISIR) for Remote Wiring and Measurement of Electronic Circuits on Breadboard," IEEE Trans. on Learning Technologies, vol. 6, No. 1, Jan.-Mar. 2013, pp. 60-72. (Year: 2013).*

* cited by examiner

*Primary Examiner* — Leigh M Garbowski
(74) *Attorney, Agent, or Firm* — Oblon, McClelland, Maier & Neustadt, L.L.P.

(57) ABSTRACT

A disclosed circuit prototyping system includes a hardware interface module configured for electronically connecting to a physical electronic device, a virtual circuit design interface to construct a virtual circuit for a plurality of virtual circuit devices including a virtual counterpart of the physical electronic device, and a circuit simulator configured to simulate the virtual circuit including communicating data with the physical electronic device by way of communication with the hardware interface module.

20 Claims, 16 Drawing Sheets

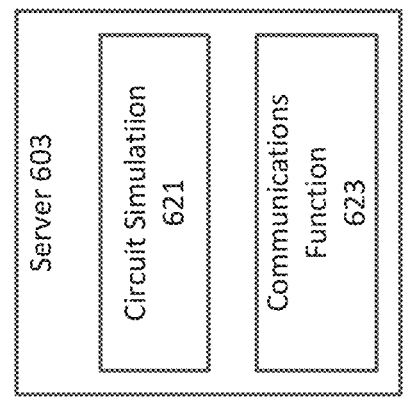
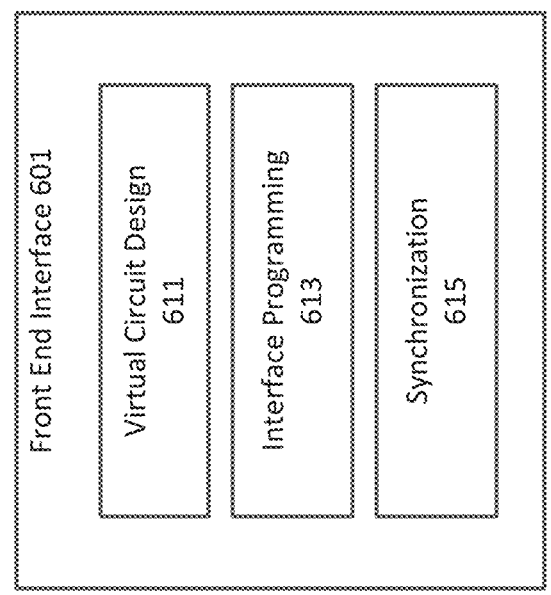
FIG. 6

SYSTEM AND METHOD OF PROTOTYPING VIRTUAL CIRCUITS WITH PHYSICAL PROXIES

CROSS REFERENCE TO RELATED APPLICATIONS

The present disclosure is based on, and claims the benefit of U.S. Provisional Application No. 62/916,969, filed on Oct. 18, 2019, which is incorporated herein by reference in its entirety.

BACKGROUND

Technical Field

The present disclosure is directed to a circuit prototyping environment that uses physical components as a physical proxy for virtual counterparts in the design of a virtual circuit.

Description of the Related Art

Physically constructing electronic circuits on a breadboard has been shown to be prone to many types of errors. As such, software-circuit-prototyping tools are becoming increasingly popular. Aside from using a virtual breadboard for prototyping, many other tools have been developed in the past several years to assist in the creation of electronic device, and many commercial software applications have been developed to facilitate PCB design. Further, software that emphasizes breadboard circuit prototyping, i.e., virtual breadboards, has gained wide adoption in the novice makers. A novice maker can now use virtual breadboards and virtual circuit components to create their projects. Testing and debugging a finished circuit is also possible with a simulator.

However, the major drawback of using software for virtual circuit prototyping is the disconnection between a user's finished virtual circuit from the physical world. Although many state-of-the-art simulators are effective in replicating circuit behaviors, a user's interaction with the circuit remains entirely virtual. Subsequently, virtual circuits designed and created on a virtual breadboard cannot be interacted with physically. This becomes an issue when prototyping interactive artifacts that involve input or output (I/O) components (e.g. sensors and motors), as a user typically needs to interact with the components physically, in a real environment.

SUMMARY

An aspect is a circuit prototyping system, including hardware interface module configured for electronically connecting to a physical electronic device; a virtual circuit design interface to construct a virtual circuit having a plurality of virtual circuit devices including a virtual counterpart of the physical electronic device; and a circuit simulator configured to simulate the virtual circuit including communicating data with the physical electronic device by way of communication with the hardware interface module.

An aspect is an interface board for interfacing between a virtual circuit executed by a circuit simulator and a physical electronic device, the physical electronic device being one of an input physical electronic device and an output physical electronic device. The interface board includes a data acquisition circuit configured to operate as one or more of a voltage divider, a resistance-capacitance circuit, and a pull-down circuit, depending on a type of the input physical electronic device when the physical electronic device is the input physical electronic device; a driver circuit configured to generate pulse width modulation signals to drive different types of the output physical electronic device when the physical electronic device is the output physical electronic device, and a hardware interface program which when executed by a processor of the interface board receives input data from the input physical electronic device or sends output data to the output physical electronic device and communicating the input data or the output data with the circuit simulator while executing the virtual circuit.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is a block diagram of software for the circuit prototyping environment in accordance with an exemplary aspect of the disclosure;

in FIG. 9B remote collaboration and sharing a resource with others (e.g., a buzzer can be controlled by a remote IR transmitter and receiver); and in FIG. 9C prototyping circuits ubiquitously constructed with build-in proxies (e.g. using built-in proximity sensor as the physical proxy of distance sensor);

FIGS. 10A, 10B, 10C, and 10D illustrate system walkthrough, wherein FIG. 10A illustrates a step in which a user designs a circuit on software and links the photoresistor as a physical proxy, where an instruction window will pop up; FIG. 10B illustrates a step in which the user can test the circuit by physically interacting with the component; FIG. 10C illustrates a step in which the user can remotely collaborate with others for help, the circuit in both sides being connected and working together; and FIG. 10D illustrates a step in which the circuit can be directly deployed with a WiFi module;

in FIG. 12B a study is performed on the desk working with an expert collaborator from a remote site; and, in FIG. 12C, a study is performed while a passenger is in a car.

DETAILED DESCRIPTION

Figure 1:
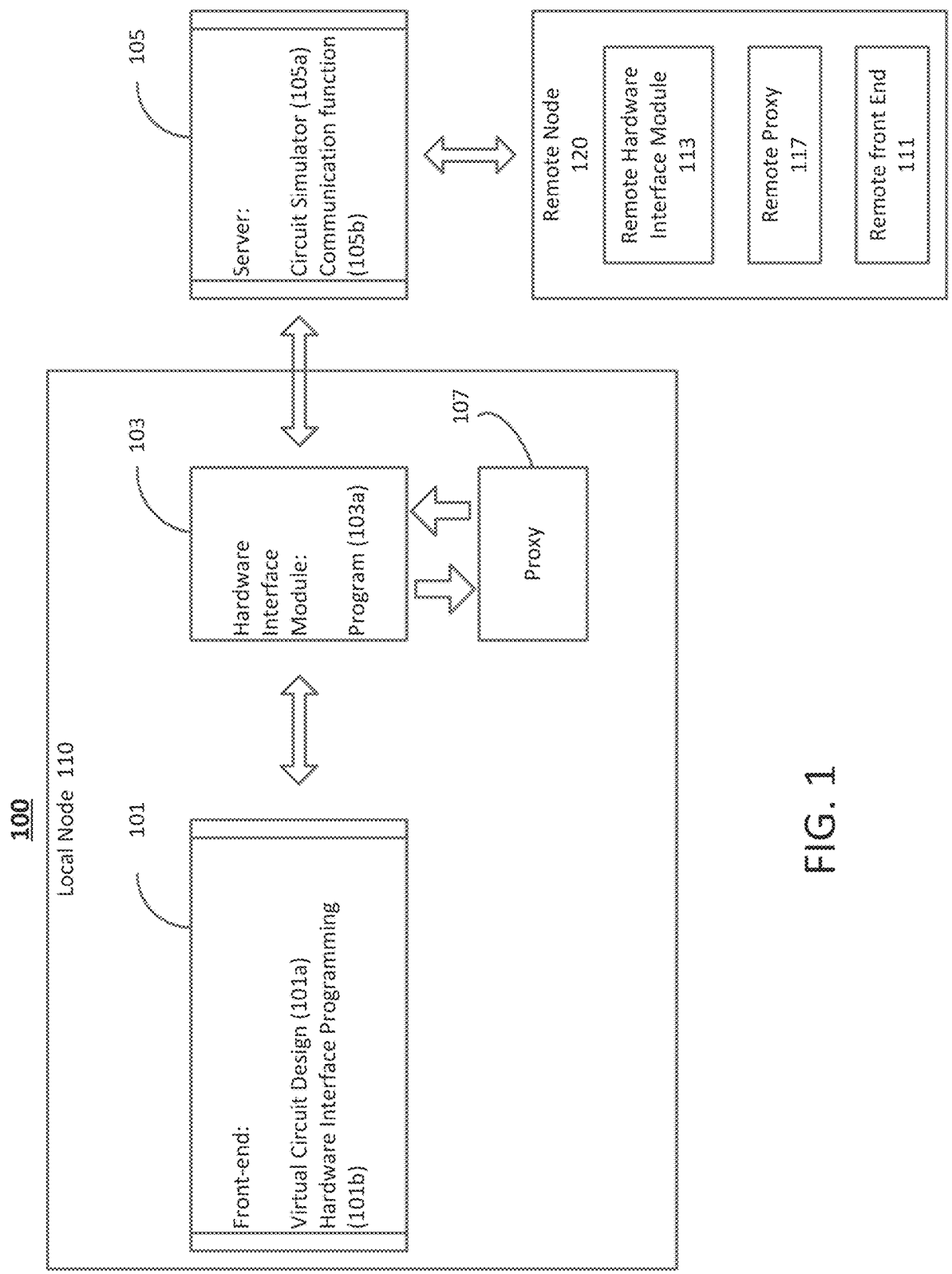
FIG. 1 is a block diagram of a circuit prototyping environment in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Prototyping interactive artifacts with electronics has become increasingly accessible due to the recent development of open-source hardware platforms (e.g., Arduino, Phidgets, or Microsoft .NET Gadgeteer). See Arduino. arduino.cc, Accessed in 2019; Saul Greenberg and Chester Fitchett. 2001; Phidgets: easy development of physical interfaces through physical widgets. In *Proceedings of the 14th annual ACM symposium on User interface software and technology* (UIST'01), ACM, 209-218. DOI: doi.org/10.1145/502348.502388; and Nicolas Villar, James Scott, Steve Hodges, Kerry Hammil and Colin Miller. 2012. NET gadgeteer: a platform for custom devices, in *International Conference on Pervasive Computing*, Springer, 216-233, DOI: doi.org/10.1007/978-3-642-31205-2_14, each of which is incorporated herein by reference in their entirety.

However, novice makers often lack basic knowledge in electronics before they can start building things. Tools that leverage generative design are very useful for beginners to test their ideas. See Fraser Anderson, Tovi Grossman and George Fitzmaurice. 2017. Trigger-Action-Circuits: Leveraging Generative Design to Enable Novices to Design and Build Circuitry. In *Proceedings of the 30th Annual ACM Symposium on User Interface Software and Technology* (UIST'17), ACM, 331-342 DOI: doi.acm.org/10.1145/3126594.3126637, incorporated herein by reference in its entirety. One challenge with this approach is that (novice) users may forego the opportunity to learn and enjoy the process of designing their own circuits.

However, physically constructing electronic circuits on a breadboard has been shown to be prone to many types of errors. See Tracey Booth, Simone Stumpf, Jon Bird and Sara Jones. 2016, crossed wires: Investigating the problems of end-user developers in a physical computing task, in *Proceedings of the 2016 CHI Conference on Human Factors in Computing Systems* (CHI'16), ACM, 3485-3497. DOI: doi.org/10.1145/2858036.2858533; and David A Mellis, Leah Buechley, Mitchel Resnick and Bjorn Hartmann. 2016, Engaging amateurs in the design, fabrication, and assembly of electronic devices, in *Proceedings of the 2016 ACM Conference on Designing Interactive Systems* (DIS'16), ACM, 1270-1281. DOI: doi.org/10.1145/2901790.2901833, each incorporated herein by reference in their entirety. A study conducted by Booth, et al. showed that hardware errors are almost always inevitable despite experience level in electronics. Common errors reported from their study include miss-wiring, incorrect component, missing components, and bad seating. Projects like CircuitStack can mitigate wiring errors, while many other hardware errors (e.g., bad seating) do not occur in software. See Chivan Wang, Hsuan-Ming Yeh, Bryan Wang, Te-Yen Wu, Hsin-Ruey Tsai, Rong-Hao Liang, Yi-Ping Hung and Mike Y Chen. 2016. CircuitStack: supporting rapid prototyping and evolution of electronic circuits, in *Proceedings of the 29th Annual Symposium on User Interface Software and Technology* (UIST'16), ACM, 687-695. DOI: doi.acm.org/10.1145/2984511.2984527, incorporated herein by reference in its entirety. As such, software-circuit-prototyping tools are becoming increasingly popular.

Aside from using a virtual breadboard for prototyping, many other tools have been developed in the past several years to assist in the creation of electronic devices. See Kayla DesPortes, Aditya Anupam, Neeti Pathak and Betsy DiSalvo. 2016, BitBlox: a redesign of the breadboard, in *Proceedings of the 15th International Conference on Interaction Design and Children* (IDC'16), ACM, 255-261. DOI: doi.org/10.1145/2930674.2930708; Björn Hartmann, Leith Abdulla, Manas Mittal and Scott R Klemmer. 2007, Authoring sensor-based interactions by demonstration with direct manipulation and pattern recognition. In *Proceedings of the SIGCHI conference on Human factors in computing systems* (CHI'07), ACM, 145-154. DOI: doi.org/10.1145/1240624.1240646; Björn Hartmann, Scott R Klemmer, Michael Bernstein, Leith Abdulla, Brandon Burr, Avi Robinson-Mosher and Jennifer Gee. 2006. Reflective physical prototyping through integrated design, test, and analysis, in *Proceedings of the 19th annual ACM symposium on User interface software and technology* (UIST'06), ACM, 299-308. DOI: doi.org/10.1145/1166253.1166300; Steve Hodges, Nicolas Villar, Nicholas Chen, Tushar Chugh, Jie Qi, Diana Nowacka and Yoshihiro Kawahara. 2014. Circuit stickers: peel-and-stick construction of interactive electronic prototypes, in *Proceedings of the SJGCHJ Conference on Human Factors in Computing Systems* (CHI'14), ACM, 1743-1746. DOI: doi.org/10.1145/2556288.2557150; Steven Houben, Connie Golsteijn, Sarah Gallacher, Rose Johnson, Saskia Bakker, Nicolai Marquardt, Licia Capra and Yvonne Rogers. 2016. Physikit: Data engagement through physical ambient visualizations in the home. In *Proceedings of the 2016 CHI Conference on Human Factors in Computing Systems* (CHI'16), ACM, 1608-1619. DOI: doi.org/10.1145/2858036.2858059; Yoshihiro Kawahara, Steve Hodges, Benjamin S. Cook, Cheng Zhang and Gregory D. Abowd. 2013. Instant inkjet circuits: lab-based inkjet printing to support rapid prototyping of UbiComp devices. In *Proceedings of the 2013 ACM international joint conference on Pervasive and ubiquitous computing* (UbiComp'13), ACM, 363-372. DOI: doi.org/10.1145/2493432.2493486; Majeed Kazemitabaar, Jason McPeak, Alexander Jiao, Liang He, Thomas Outing and Jon E Froehlich. 2017. Makerwear: A tangible approach to interactive wearable creation for children. In *Proceedings of the 2017 CHI conference on human factors in computing systems* (CHI'17), ACM, 133-145. DOI: doi.org/10.1145/3025453.3025887; Joanne Lo, Cesar Torres, Isabel Yang, Jasper O'Leary, Danny Kaufman, Wilmot Li, Mira Dontcheva and Eric Paulos. 2016. Aesthetic Electronics: Designing, Sketching, and Fabricating Circuits Through Digital Exploration. In *Proceedings of the 29th Annual Symposium on User Interface Software and Technology* (UIST'16), ACM, 665-676. DOI: doi.org/10.1145/2984511.2984579; Raf Ramakers, Fraser Anderson, Tovi Grossman and George Fitzmaurice. 2016. Retrofab: A design tool for retrofitting physical interfaces using actuators, sensors and 3d printing. In *Proceedings of the 2016 CHI Conference on Human Factors in Computing Systems*

(CHI'16), ACM, 409-419. DOI: doi.org/10.1145/ 2858036.2858485; RafRamakers, Kashyap Todi and Kris Luyten. 2015. PaperPulse: an integrated approach for embedding electronics in paper designs. In *Proceedings of the 33$^{rd}$ Annual ACM Conference on Human Factors in Computing Systems* (CHI'15), ACM, 2457-2466. DOI: doi.org/10.1145/2702123.2702487; and Mitchel Resnick, Fred Martin, Randy Sargent and Brian Silverman. I 996. Programmable bricks: Toys to think with. IBM Systems journal, 35 (3.4). 443-452. DOI: dx.doi.org/10.1147/ sj.353.0443, each incorporated herein by reference in their entirety. For example, with Exemplar and PICL, a user can create sensor-based interactive artifacts using "programming by demonstration". See Adam Fourney and Michael Terry. 2012. PICL: portable in-circuit learner. In *Proceedings of the 25$^{th}$ annual ACM symposium on User interface software and technology* (UIST'12), ACM, 569-578. DOI: doi.org/0.1145/2380116.2380188, incorporated herein by reference in its entirety.

Children can develop electronic hardware using augmented toys like LEGO bricks embedded with sensors and actuators. A major difference between these approaches and breadboard prototyping, is that these tools are all restricted to a specific platform, which means that a user does not have complete freedom in creation (e.g. platform might be missing an accelerometer). In contrast, a breadboard is much more flexible but of course more difficult to use.

Aside from hardware errors, adjusting breadboard components (e.g., different resistors) is also challenging on a physical breadboard. To address this problem, VirtualComponent provides a mixed reality system with a custom breadboard that preloads several possible components into PCB modules, and a user can dynamically place components and see values and potential errors. See Yoonji Kim, Youngkyung Choi, Hyein Lee, Geehyuk Lee and Andrea Bianchi. 2019. VirtualComponent: A Mixed-Reality Tool for Designing and Tuning Breadboarded Circuits, in *Proceedings of the 2019 CHI Conference on Human Factors in Computing Systems* (CHI'19). DOI: doi.org/10.1145/ 3290605.3300407, incorporated herein by reference in its entirety.

A similar approach can be found in Scanalog, whose goal is to facilitate the design and debugging of analog circuits through a dataflow programming paradigm using functional modules, instead of components and breadboard circuit. See Evan Strasnick, Maneesh Agrawala and Sean Follmer, 2017. Scanalog: Interactive Design and Debugging of Analog Circuits with Programmable Hardware. In *Proceedings of the 30th Annual ACM Symposium on User Interface Software and Technology* (UIST'17), ACM, 321-330. DOI: doi.acm.org/10.1145/3126594.3126618, incorporated herein by reference in its entirety. LabView is a commercial product, which also uses a dataflow paradigm, but for the design of complex electronic systems. See Lab View. www.ni.com/ en-us/shop/labview.html. Accessed in 2019, incorporated herein by reference in its entirety. The LabView tool was designed for professional users and requires a specialized hardware setup.

Software Circuit Prototyping Tools

Many commercial software applications have been developed to facilitate PCB design. See Altium Designer 17 Overview. www.altium.com/altium-designer/. Accessed in 2019; and EAGLE PCB Design and Schematic Software. 2017, each incorporated herein by reference in their entirety. However, these professional tools while effective, are not especially tailored for novice makers. As such, software that emphasizes breadboard circuit prototyping has gained wide adoption in the novice maker communities. See TinkerCad Circuit www.tinkercad.com/circuits. Accessed in 2019; VirtualBreadboard www.virtualbreadboard.com/; and Andre Knorig, Reto Wettach and Jonathan Cohen. 2009. Fritzing: a tool for advancing electronic prototyping for designers. In *Proceedings of the 3$^{rd}$ International Conference on Tangible and Embedded Interaction* (TEI'09), ACM, 351-358. DOI: doi.org/10.1145/1517664.1517735, each incorporated herein by reference in their entirety. For example, TinkerCad Circuit allows users to construct a breadboard circuit using a virtual breadboard and electronic components. It also offers a simulator for users to test and debug the function of their circuit designs. The software application also supports remote collaboration and most noticeably the simulation of the behavior of common input and output components. One key limitation is that a user's design is entirely virtual, and thus cannot be directly interacted with in the physical environment.

Circuit Debugging Tools

The fact that circuit errors are unavoidable motivated a separate line of research and commercial products in supporting circuit debugging. For example, Digilent Electronics Explorer is a breadboard that allows users to debug breadboard circuits through built-in oscilloscope, pattern generators, and logic analyzer. See Digilent Electronics Explorer. store.digilentinc.com/electronics-explorer-all-in-one-usboscilloscope-multimeter-workstation/accessed in 2019, incorporated herein by reference in its entirety. The challenge is that novices may not have the background to operate these tools.

As a result, an area of research arose focusing on easing the debugging process through the visualization of a circuit's internal state. Toastboard, Bifrost, and CurrentViz are examples. See Daniel Drew, Julie L Newcomb, William McGrath, Filip Maksimovic, David Mellis and Bjorn Hartmann. 2016. The Toastboard: Ubiquitous Instrumentation and Automated Checking of Breadboarded Circuits. In *Proceedings of the 29th Annual Symposium on User Interface Software and Technology* (UIST'16), ACM, 677-686. DOI: doi.org/10.1145/2984511.2984566; Will McGrath, Daniel Drew, Jeremy Warner, Majeed Kazemitabaar, Mitchell Karchemsky, David Mellis and Bjorn Hartmann. 2017. Bifrost: Visualizing and Checking Behavior of Embedded Systems across Hardware and Software. in Proceedings of the 30$^{th}$ Annual ACM Symposium on User Interface Software and Technology (UIST' 17), ACM, 299-310. DOI: doi.org/10.1145/2901790.2901833; and Te-Yen Wu, Hao-Ping Shen, Yu-Chian Wu, Yu-An Chen, Pin-Sung Ku, Ming-Wei Hsu, Jun-You Liu, Yu-Chih Lin and Mike Y Chen. 2017. Current Viz: Sensing and Visualizing Electric Current Flows of Breadboarded Circuits. In *Proceedings of the 30$^{th}$ Annual ACM Symposium on User Interface Software and Technology* (UIST'17), ACM, 343-349. DOI: doi.acm.org/10.1145/ 3126594.3126646, each incorporated herein by reference in their entirety.

A key observation of these works is that sensing the location, type, and value of the breadboard components play a key role in easing the debugging process. Although little research has focused on this space, CircuitSense has shown the feasibility of recognizing some of the common electronic components using a sensor setup that is somewhat bulkier than a regular breadboard. See Te-Yen Wu, Bryan Wang, Jiun-Yu Lee, Hao-Ping Shen, Yu-Chian Wu, Yu-An Chen, Pin-sung Ku, MingWei Hsu, Yu-Chih Lin and Mike Y Chen. 2017. CircuitSense: Automatic Sensing of Physical Circuits and Generation of Virtual Circuits to Support Software Tools. In *Proceedings of the 30th Annual ACM Symposium* on *User Interface Software and Technology* (UIST'17), ACM, 311-319. DOI: doi.acm.org/10.1145/3126594.3126634, incorporated herein by reference in its entirety.

The benefits of virtual and physical circuits are complementary to each other. Taking advantage of both sides can enable a much more powerful tool.

With regard to physical circuits, circuit prototyping using a physical breadboard and real electronic components is the default approach for many novice users. The benefit is clear as the constructed circuit is real and thus can be tried or tested immediately in a real environment. This is important for a number of reasons. First, the behavior of a circuit can be precisely observed and adjusted in the environment, where the circuit components are operating. This is particularly true for circuits involving sensors or actuators. For example, the threshold of a photoresistor can be precisely determined in a real environment where the sensor is being used. Similarly, a user can only tell if the torque of a motor is strong enough for a certain project by testing the real motor itself (without doing all the math and physics). Second, with real input and output components, the finished project can be demonstrated to others. Finally, the project can be deployed right away if needed. In contrast, deployment of a project that is first implemented using software would require that the user manually replicate the design on a physical breadboard.

As noted above, software that emphasizes breadboard circuit prototyping, i.e., virtual breadboards, has gained wide adoption in the novice makers. A novice maker can now use virtual breadboards and virtual circuit components to create their projects. Testing and debugging a finished circuit is also possible with a simulator. Circuit design using software has a number of unique benefits over a physical breadboard. For example, the user does not have to maintain an inventory of common electronic components that may have varying types and values (e.g., ICs, resistors, or capacitors, etc.). This is a common barrier for novice makers who begin prototyping. Additionally, features like copy/paste, undo/redo, tooltips, autocomplete, and remote collaboration have made circuit prototyping through software an efficient and less error-prone experience for novices. See Jo-Yu Lo, Da-Yuan Huang, Tzu-Sheng Kuo, Chen-Kuo Sun, Jun Gong, Teddy Seyed, Xing-Dong Yang and Bing-Yu Chen. 2019. AutoFritz: Autocomplete for Prototyping Virtual Breadboard Circuits. In *Proceedings of the* 2019 *CHI Conference on Human Factors in Computing Systems* (CHI'19). DOI: doi.org/10.1145/3290605.3300633; and TinkerCad Circuit, each incorporated herein by reference in their entirety. Finally, virtual circuits can be easily stored, documented, and shared among different users, groups and even across different locations via the Internet. This is not as easy using a physical breadboard.

Aspects of this disclosure are directed to a breadboard circuit prototyping environment that blends the virtual and physical world, by enabling the use of real (physical) I/O components (e.g. a motor, or flex resistor) as a physical proxy of their virtual counterparts, in a virtual circuit designed and constructed in software. The physical proxies themselves behave as though the entire circuit created virtually is real.

FIG. 1 is a block diagram of a breadboard circuit prototyping environment in accordance with an exemplary aspect of the disclosure. Embodiments of the circuit prototyping environment 100 are comprised of three parts: front-end software 101 with a virtual circuit design component 101a having a virtual breadboard circuit and a hardware interface programming component 101b, a hardware interface module 103, for example, in the form of an Arduino UNO shield and an associated Arduino UNO board, in which the Arduino shield interfaces with one or more physical proxies 107, and is in continuous communication with a backend server 105 that runs the virtual breadboard circuit in a circuit simulator 105a and handles data synchronization (105b) between the hardware interface module 103 of a local node 110, the user's program code 103a being executed in a host processor for the hardware interface module 103, and remote nodes 120, during remote collaboration sessions. A remote node 120 may include a remote hardware interface module 113 and a remote proxy 117, and in some embodiments a remote front end 111.

Figure 2:
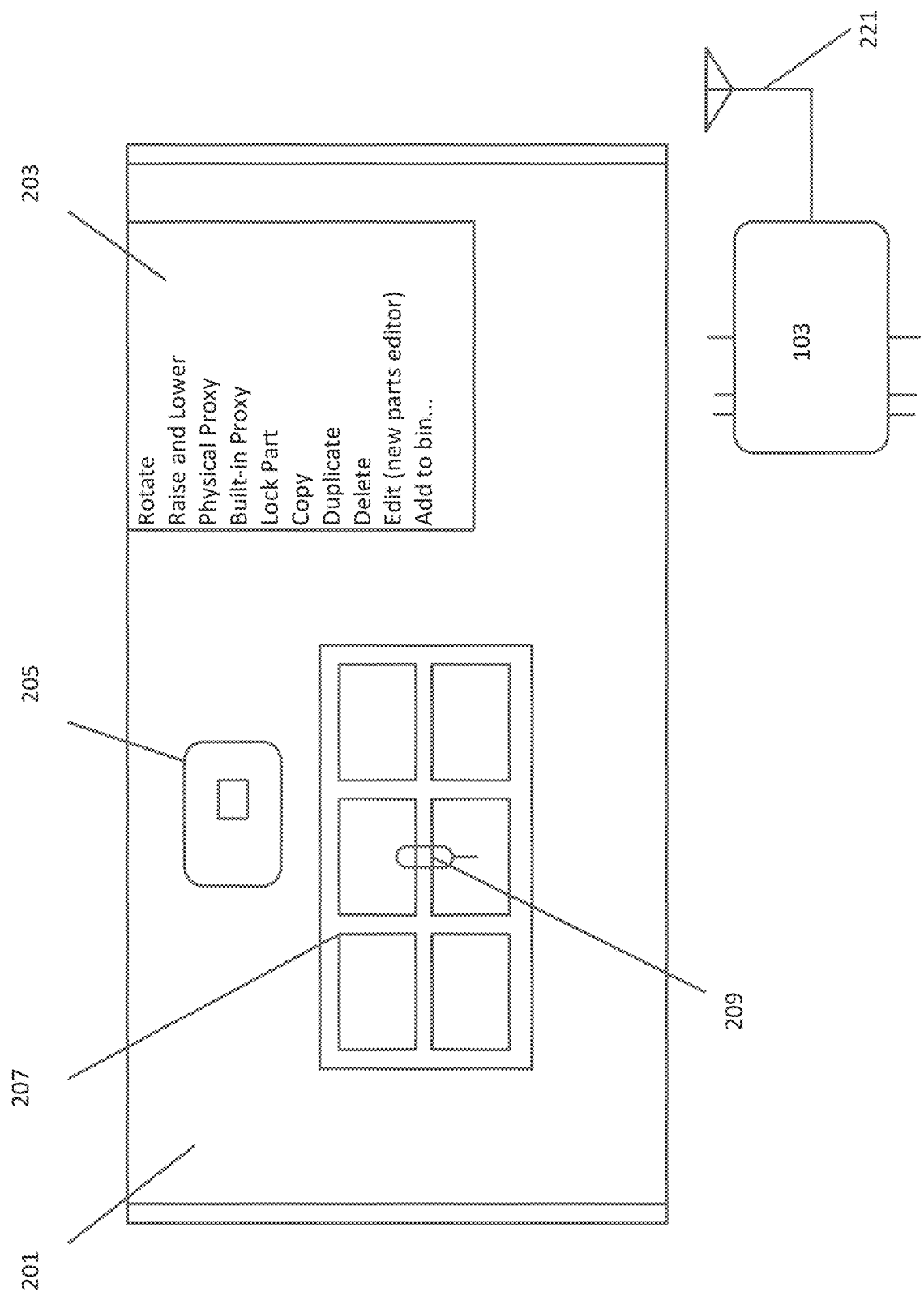
FIG. 2 is a user's perspective of the circuit prototyping environment in accordance with an exemplary aspect of the disclosure.

FIG. 2 is a user's perspective of the circuit prototyping environment in accordance with an exemplary aspect of the disclosure. The virtual circuit design component 101 has a graphical user interface 201 that may include a menu 203 of functions, such as connecting a physical proxy (linking a virtual circuit to a physical proxy) and connecting a built-in proxy (linking a virtual circuit to a built-in proxy). The graphical user interface 201 may include virtual breadboard circuit 207 in which one or more virtual circuits 209 can be mounted. The graphical user interface 201 can display a virtual version 205 of the hardware interface module 103. A physical proxy 221 may be electronically connected to the hardware interface module 103 and linked to a counterpart virtual circuit 209 through the menu 203. In some embodiments, the physical proxy 221 can be a real I/O component.

Once a physical proxy is linked to a counterpart virtual circuit, the hardware interface module 103 synchronizes the circuit behavior between them. For example, if the physical proxy is an input component, the hardware interface module 103 will measure its analog value (e.g., voltage, capacitance, and resistance) and send the data to the counterpart virtual circuit, which is then taken into the calculation of the circuit simulator running in the backend server 105. A similar approach is used as the physical proxy is an output component. The hardware interface module 103 receives the analog value (e.g., voltage) of the counterpart virtual circuit calculated by the circuit simulator, and then drives the physical proxy based on the analog values.

Hardware Interface Module

Figure 3:
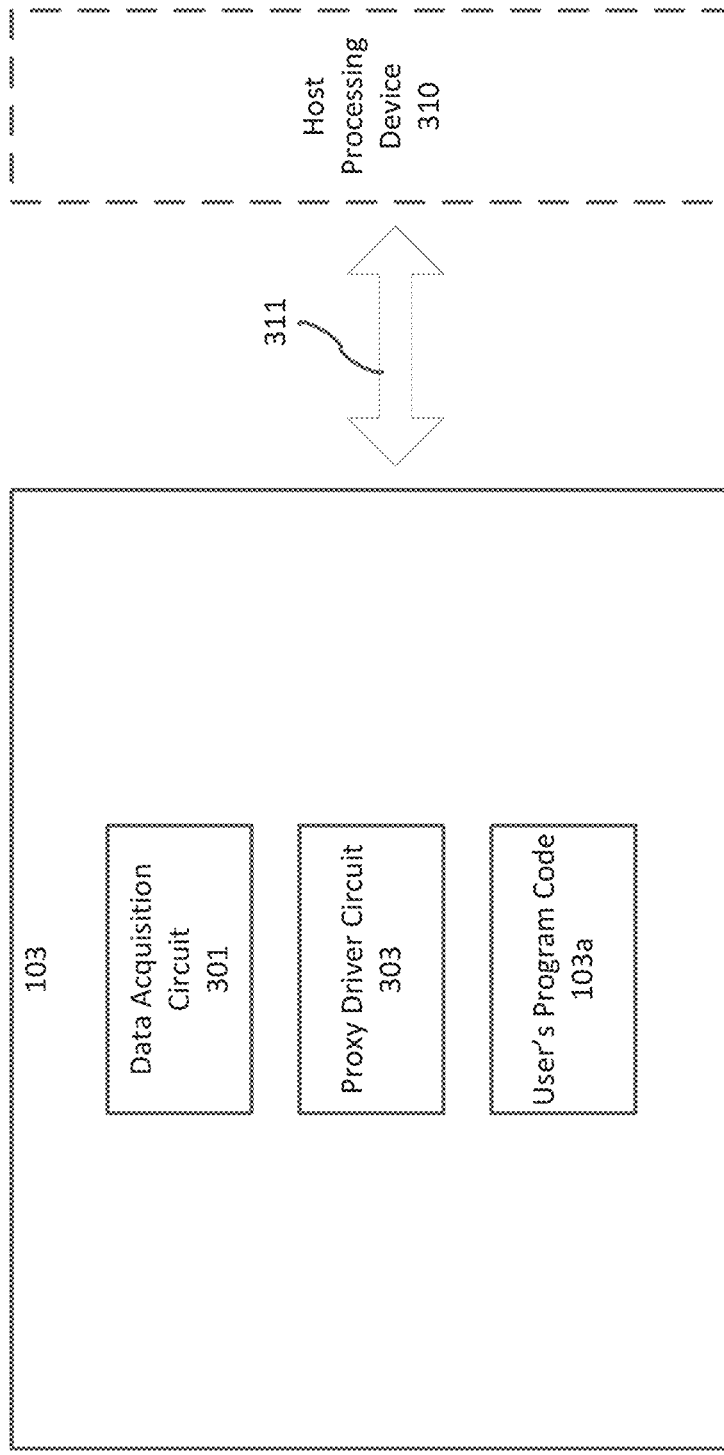
FIG. 3 is a block diagram of the hardware interface module in accordance with an exemplary aspect of the disclosure.

FIG. 3 is a block diagram of the hardware interface module in accordance with an exemplary aspect of the disclosure. In some embodiments, the hardware interface module 103 can be electronically connected to a host processing device 310. The circuit prototyping environment 100 uses the hardware interface module 103 to handle physical proxies 107 that are either a singleton (i.e., single electrical or electro-mechanical component) or a module (i.e., two or more electrical or electro-mechanical components). The hardware interface module 103 can be configured with a user's program code 103a to measure analog signals of physical input devices or provide analog signals to physical output devices. Many singletons do not function properly on their own. Measuring the analog signals from modules can be difficult. For example, the resistance of a photoresistor cannot be measured. To measure the resistance of the photoresistor, a module consisting of a resistor can be used with the photoresistor to form a voltage divider. Similarly, a DC motor does not work without an actual motor driver. The hardware interface module 103 handles these situations using a data acquisition circuit 301 and a proxy driver circuit 303. Depending on the type of physical proxy 107, the data acquisition circuit 301 can be in the form of a voltage divider, resistance-capacitance circuit, or pull-down circuit, allowing the device to measure input voltage, resistance, capacitance, or switch status for varying applications. The proxy driver circuit 303 can generate pulse width modulation (PWM) signals in a frequency of 500 Hz at a proper duty cycle and peak value to drive different types of output singletons.

A small number of I/O singletons are self-functional without the need to access the inside of a module with supporting components. Examples include a temperature sensor, a proximity sensor, and a servo motor. Therefore, getting input or output to such devices is straightforward. The user can even use a hardware interface module 103 directly. Modules are similar, but in cases when a module proxy is incomplete (e.g., missing a resistor), its I/O component is treated as a singleton, so using the hardware interface module 103 is necessary. Using the hardware interface module 103 in this way is the easiest way to properly interact with the corresponding I/O component without significantly increasing the complexity of the hardware interface module 103.

Implementation of the Hardware Interface Module

Figure 4:
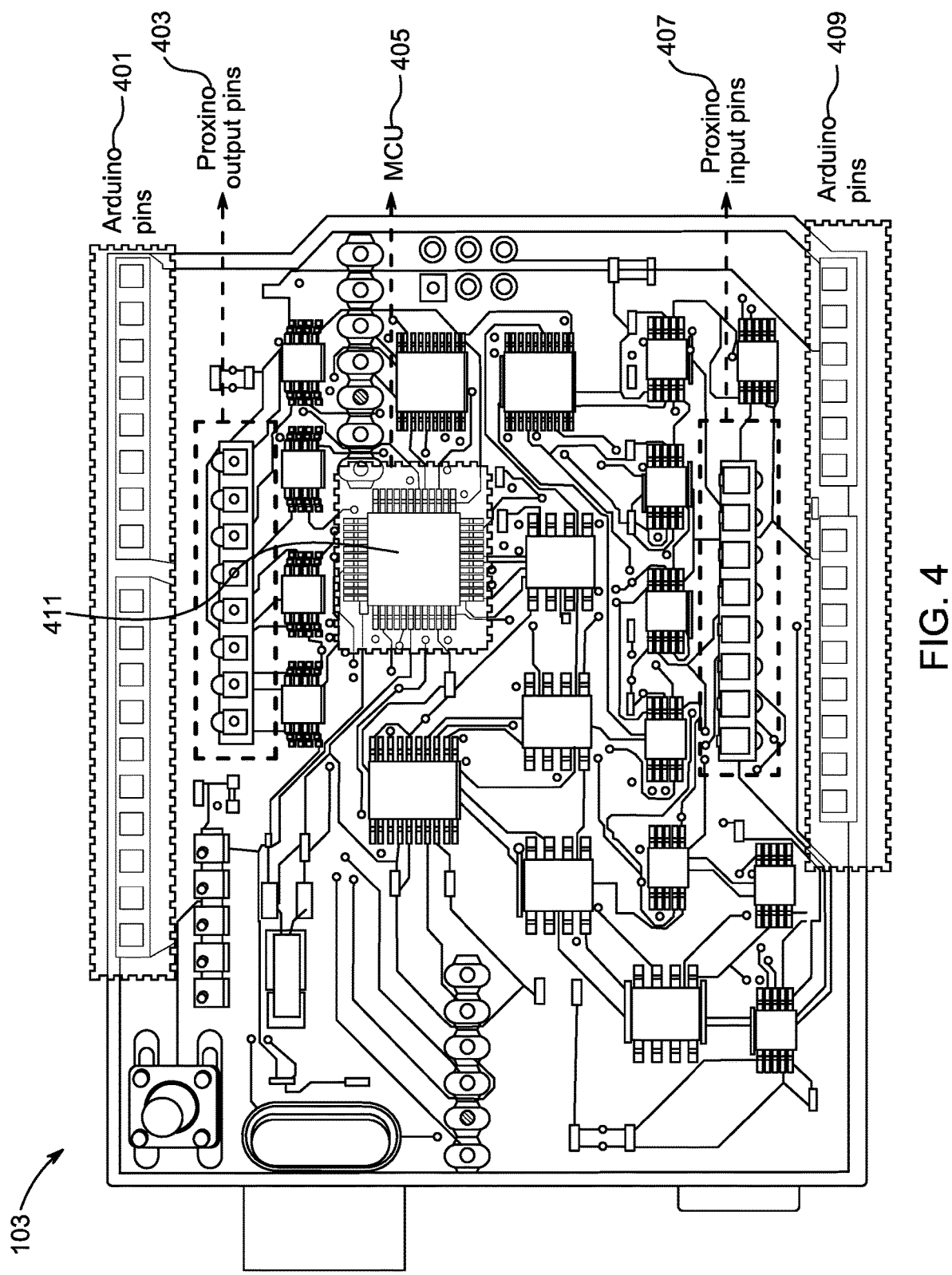
FIG. 4 illustrates the hardware interface module PCB in the form of a modified Arduino shield.

FIG. 4 illustrates an exemplary hardware interface module PCB in the form of an Arduino shield. The Arduino shield is an expansion board for an Arduino board (host processing device). The Arduino shield includes I/O pins 401, 409. An implementation of the Arduino shield is configured with a total of 16 additional I/O pins 403, 407 for interacting with physical proxies (107). Half of the I/O pins 407 are used for physical input components and the remaining half of the I/O pins 403 are for physical output components. The Arduino shield uses pins 8 and 9 (405) to communicate 311 with its host Arduino board 310. It also may provide pin accesses to all other pins 401, 409 on the processor printed circuit board 310. This is useful in the cases when the user wants to use the Arduino board directly.

Figure 5:
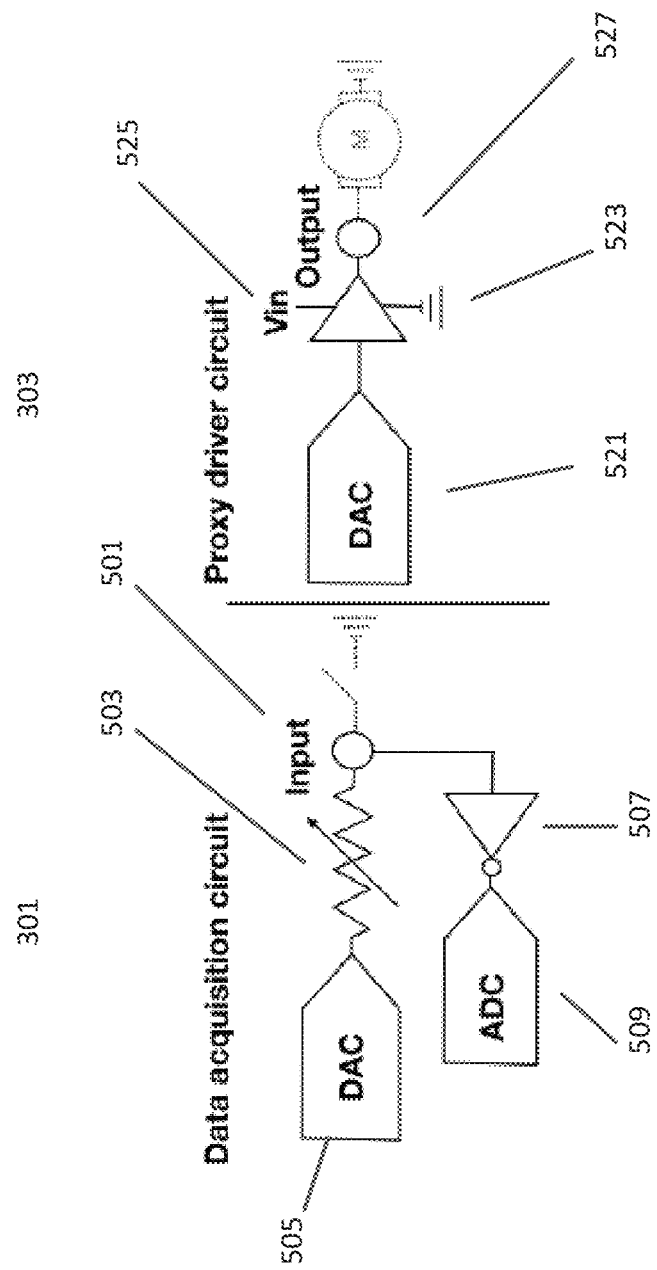
FIG. 5 illustrates an exemplary data acquisition circuit, for input components, and an exemplary proxy driver circuit for output components.

In one embodiment, the hardware interface module PCB can be built around a Nuvoton ARM Cortex-M4 microcontroller 411, a data acquisition circuit 301, and proxy driver circuit 303. FIG. 5 illustrates an exemplary data acquisition circuit, for input components, and an exemplary proxy driver circuit for output components. The data acquisition circuit 301 can receive an input 501 from a physical input device. In one embodiment, the data acquisition circuit 301 can be composed of an 8-channel digital-to-analog converter (DAC 605) (AD5628BRUZ, Analog Device inc.), a digital potentiometer 503 (AD5270BRMZ-100, Analog Device inc.), an 8-channel analog-to-digital converter (ADC 509) (AD7928BRUZ, Analog Device inc.), and an amplifier 507 (AD8066ARZ, Analog Device inc.) serving as a voltage buffer for the ADC 509. The digital potentiometer 503 includes a contact that can function as an adjustable voltage divider.

In one embodiment, the data acquisition circuit 301 can include a variable resistor (pull-down resistor) or a resistor-capacitor (control of resistance or capacitance). In this embodiment, the proxy driver circuit 303 can be composed of an 8-channel DAC 521 and eight high-output-drive amplifier 523 (TLV4112, Texas Instruments inc.), connected to the VIN pin 525 for extra current supply. This proxy driver circuit can generate output voltage up to 6V and current up to 500 mA (527), needed for different types of motors. The hardware interface module 103 can be compatible with an Arduino UNO and communicate with it using the UART protocol with a baud rate limit of 115200 bps.

Software Implementation

FIG. 6 is a block diagram of software for the circuit prototyping environment in accordance with an exemplary aspect of the disclosure. Software for the circuit prototyping environment 100 can include a front-end breadboard circuit design and programming tool 601 and a back-end server 603 handling circuit simulation, data synchronization between the simulator and a user's Arduino program code, and remote collaboration.

Front-End (101)

Virtual Circuit Design Component (101a)

An example virtual circuit design environment 611 uses a virtual circuit design interface as a part of Frtizing, a circuit prototyping tool common in the maker community. See Fritzing Software, fritzing.org/home/(accessed in 2019), incorporated herein by reference in its entirety. The example virtual design environment 611 also provides a user with options to interact with virtual I/O components through physical proxies in the form of either an electronic component or the built-in sensors or actuators of a mobile device. The virtual circuit design environment 611 also enables a user to manually adjust the value of an input component (e.g., resistance of a flex resistor) to see how the constructed circuit behaves accordingly. This is useful for testing and debugging the circuit virtually. Remote collaboration is supported by enabling multiple users from different locations to construct a circuit at the same time, using a shared virtual breadboard.

Hardware Interface Module Programming Component (101b)

Figure 8:
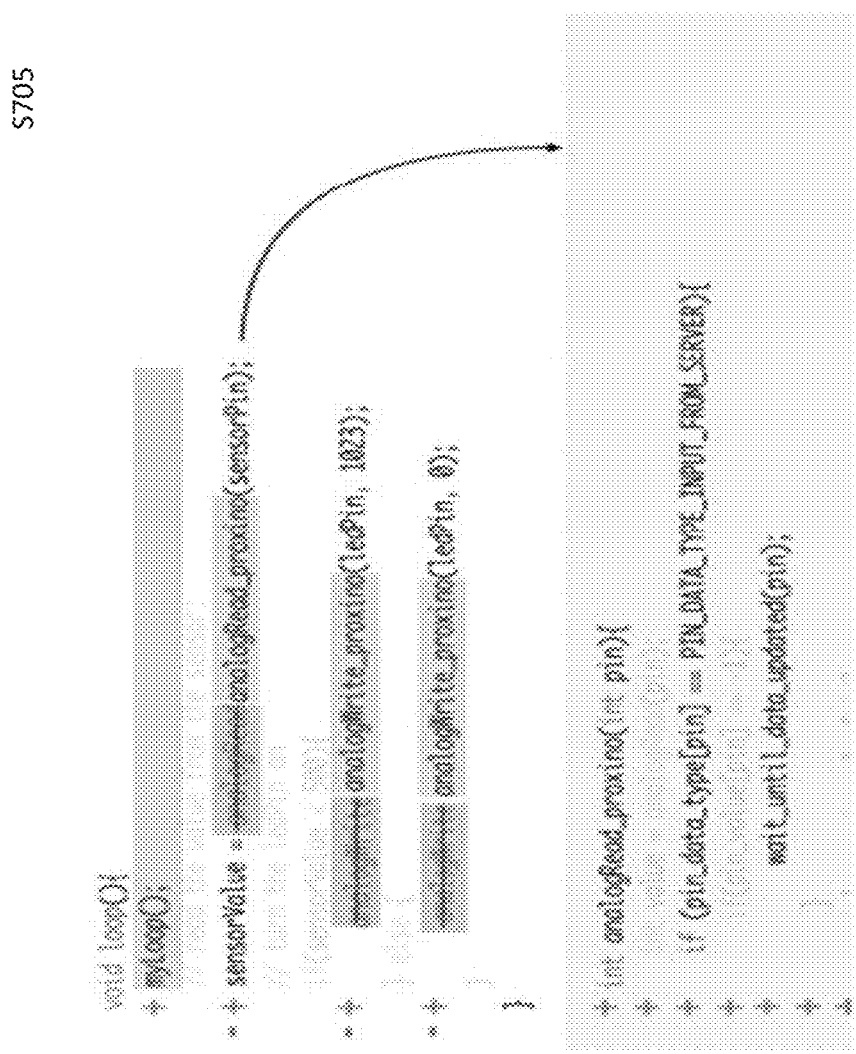
FIG. 8 illustrates an exemplary operation of the software to automatically modify the user's program to pause the user's code until data from the simulator arrives.

Users can develop a program for the hardware interface module 103 using an interface programming environment 613. In one embodiment, an Arduino program can be developed in Fritzing's built-in Arduino IDE. In addition to the use of a virtual circuit and physical proxies, the user may program the circuit as though it is real. From the circuit prototyping environment's perspective however, it is important to synchronize the execution of the user's code, especially for input functions like analogRead( ) as the circuit simulator 105a runs slower than the code. Again, regarding the photoresistor example, nothing beyond analogRead( ) may be executed until after the simulator calculates the input voltage of the photoresistor. Output is similar, as the execution of analogWrite( ) may be paused until the output PWM signal for the LED proxy arrives from the simulator. The interface programming environment 613 achieves this by injecting custom code into the user's program. For example, as shown in FIG. 8, the calls to analogRead( ) and analogWrite( ) are replaced with custom functions that pause the user's code until data from the circuit simulator arrives. The interface programming environment 613 modifies the user's program code only after the user clicks the "Run" button, prior to the code being compiled.

The front end interface 601 may rely on continuous communication between the circuit simulator running on the server 105 and the program running on the hardware interface module 103. Some applications may require interrupts (e.g. such as the communication to a computer) be disabled temporarily while reading data from an input component. For example, in programing a capacitive sensor to count the CPU cycles required to pull up a sensor pin, it is often necessary to have all interrupts disabled (e.g., by calling noInterrupts( ) while reading sensor data. This may cause a system failure, as the system relies on the communication between a hardware interface module and the circuit simulator to exchange data for input and output. A solution to this problem is to run interrupt-sensitive logic on the backend server 105 instead of on the hardware interface module 103, and have the result to be returned to the board. For example, the number of CPU cycles it takes for a sensor pin to be pulled up can be estimated by running the counting logic on the backend server 105, as the processor cycle of the user's program is known. From a user's perspective, they do not make any changes in their program.

Backend Server (105)

Circuit Simulator (105*a*)

The circuit simulator 105*a* can be implemented using LiveSpice, an open source circuit simulation tool for analog circuits. See LiveSPICE. www.livespice.org. Accessed in 2019, incorporated herein by reference in its entirety. The source code for circuit simulation 621 is modified to allow the tool to take real-time input data from physical proxies and calculate output voltage values based on a user's interaction with a proxy. Since LiveSpice does not provide the mathematical models for the common I/O components, I/O components such as LEDs, hobby motors, vibrating motors, and buzzers have been implemented.

Network Server (105*b*)

A custom server communications function 623 has been developed to handle communication for remote collaboration. The communications function 623 takes all changes that occur on remote nodes 120, such as user interactions with remote proxies 117 or modifications on the shared circuit. It communicates these changes to the circuit simulator 105*a* and reports the results back to remote clients. In one embodiment, the server communications function 623 is written in Node.js and communicates with each client using Socket.IO.

Proxy Design Space

The design space uses a physical proxy for common circuit components in four dimensions: Component Type, Proxy Type, Proxy Location, and Proxy Module Form.

A1: Component Type

Different types of electronic components can be used as a physical proxy for a virtual circuit. To facilitate the discussion, components are classified into three categories based on their roles in supporting physical interactions with a breadboard circuit: (1) supporting components, (2) input components, and (3) output components.

Supporting components are the building blocks used to form functional circuits for input and output components. Common supporting components include integrated circuits (ICs) (e.g., H-bridges and amplifiers) and basic components like resistors, capacitors, inductors, diodes, and transistors, etc. Physical supporting components preserve the behavior of the circuits, and thus can lead to more realistic signals. However, some supporting components have many different types and values. Maintaining an ample inventory of them can be challenging for novice makers, especially if they don't entirely understand the function of all the components. In disclosed embodiments support components are interactive.

Input components are input devices (e.g., buttons) or sensors (e.g., photoresistor). Many input components need to be used with basic components or ICs to function properly or safely. For example, a PIR sensor needs an amplifier for increased signal amplitude for high-resolution data processing. Input components can be either virtual or physical. For example, a user often needs to interact with input components physically to provide input or collect data from the environment. Therefore, a physical proxy can be helpful. Virtual input components are useful in scenarios where physical interaction is not a need, or the required physical components are unavailable (e.g., a user did not purchase one).

Output components are output devices such as LEDs or motors. Similar to input components, many output components also require an appropriate basic component or IC to work properly. A DC motor is an example, as it requires a motor driver or transistor to operate with an Arduino. Some output components can benefit more from a physical proxy than others. For example, a real servo motor has a clear advantage over the virtual one if the user wants to test how well it works to actuate a physical object. A virtual LED, on the other hand, can perhaps be as useful as a physical one for the sake of feedback. However, lighting a real LED could give the user a more engaging experience.

A2: Proxy Type

The physical proxy can be a singleton or module. The singleton has only one I/O component. Many singletons do not function properly on their own without a supporting component(s). A module, on the other hand, is an electrically functional circuit, composed of an I/O component and one or more supporting components. For example, a photoresistor module is composed of a photoresistor (input component) and a resistor (base component), which works independently if powered.

A3: Proxy Location

Virtual circuit prototyping can take place collaboratively among different users either locally or remotely. During remote collaboration, the physical proxy can be collocated with the user or located in a remote location. This allows users in different locations to have shared access to distributed physical resources only available in a remote site.

A4: Proxy Module Form

I/O modules can go beyond their regular form and utilize the built-in I/O devices on a smartphone, tablet, or laptop. For example, the user can develop a virtual circuit on a tablet and use the device's built-in accelerometer as the physical proxy of the virtual one. This way, the software and the physical proxies of the virtual components are integrated into a single device, largely increasing the mobility of the system.

Figure 7:
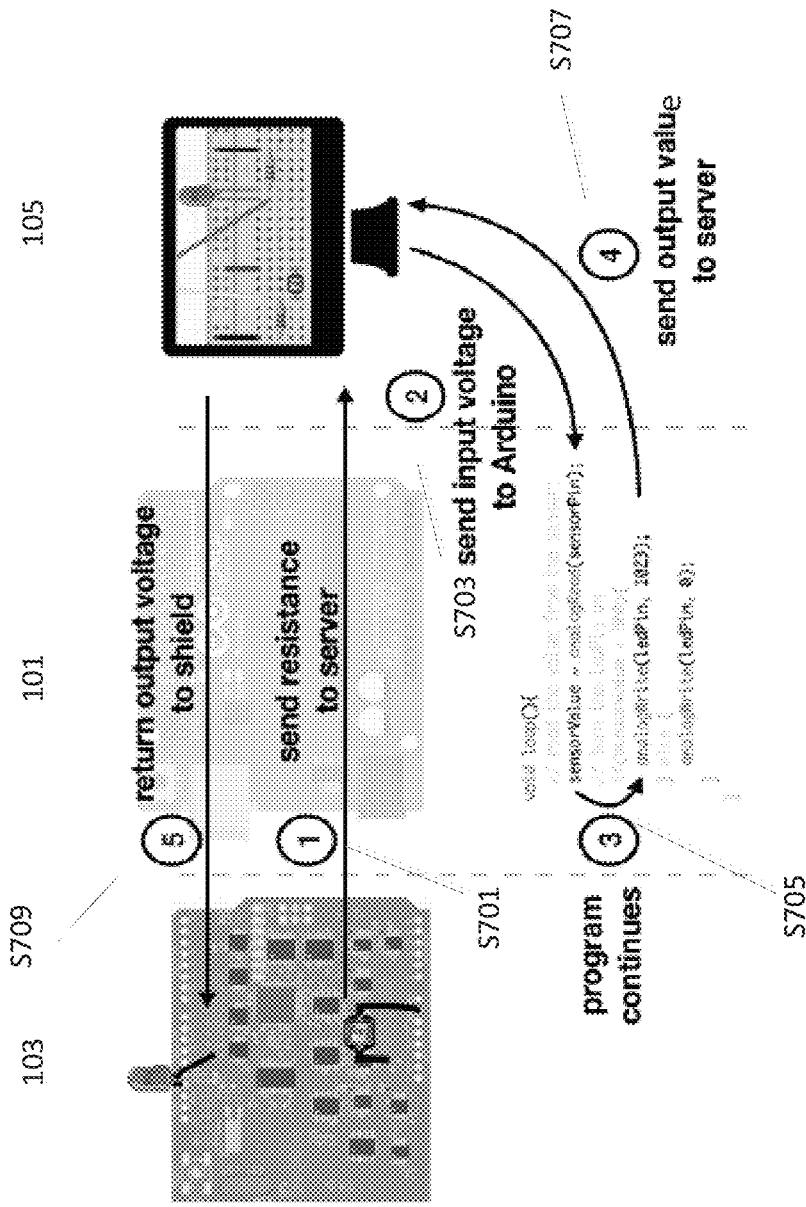
FIG. 7 is a diagram illustrating the system workflow.

FIG. 7 is a diagram illustrating the circuit prototyping environment workflow. Embodiments of the disclosed circuit prototyping environment 100 use a physical proxy as the link between the virtual world and physical world. That is, users can augment parts of their virtual circuit with virtual components of counterpart real components, when they need to physically interact with components.

Typically, when a user starts an electronics project from scratch, they need to write code (e.g., Arduino code) to read or write to I/O components that enable controlling the behavior of the circuit. In disclosed embodiments, the construction of a real circuit is not required by a user. Instead, the circuit prototyping environment 100 uses a circuit simulator 105*a*. Therefore, the hardware interface module program's read or write functions (e.g., analogRead( ) or analogWrite( )) now communicate with the circuit simulator 105*a*. The process can be described as follows.

When a user constructs a virtual circuit 101*a*, e.g. in Fritzing, the circuit is also created in the circuit simulator 105*a* by the server 105.

The hardware interface module 103, e.g., Arduino shield, takes the real-time input from the input proxy 107 by measuring its analog value (e.g., voltage, capacitance, and resistance).

In S701, the hardware interface module 103 then sends data to the circuit simulator 105*a* running in the background of a server computer 105 (e.g. laptop computer or desktop computer) via the host processor of the hardware interface module 103.

The data is used along with the mathematical model of the user's virtual circuit by the circuit simulator 105*a* to recover the component's input voltage. As an example, in S703, hardware interface module 103 captures the changes in the resistance of the photoresistor through an input pin of the hardware interface module 103. It passes the data to the circuit simulator 105a, which then recovers the input voltage of the photoresistor using the voltage divider equation.

In S705, if a read function in the user's program 101a is called, the input voltage is returned to the program. For example, when the analogRead( ) is executed, the hardware interface module 103 converts the current input voltage into an integer value between 0 and 1023 to overwrite the return value of the analogRead( ).

Output uses a similar approach, as when a write function is executed. In S707, the hardware interface module 103 generates PWM signals based on the user's specification of duty cycle in analogWrite( ), which was then plugged into the circuit simulator 105a to calculate the right peak value for the hardware interface module 103 to, in S709, drive the proxy 107.

Example Implementations

Figure 9A:
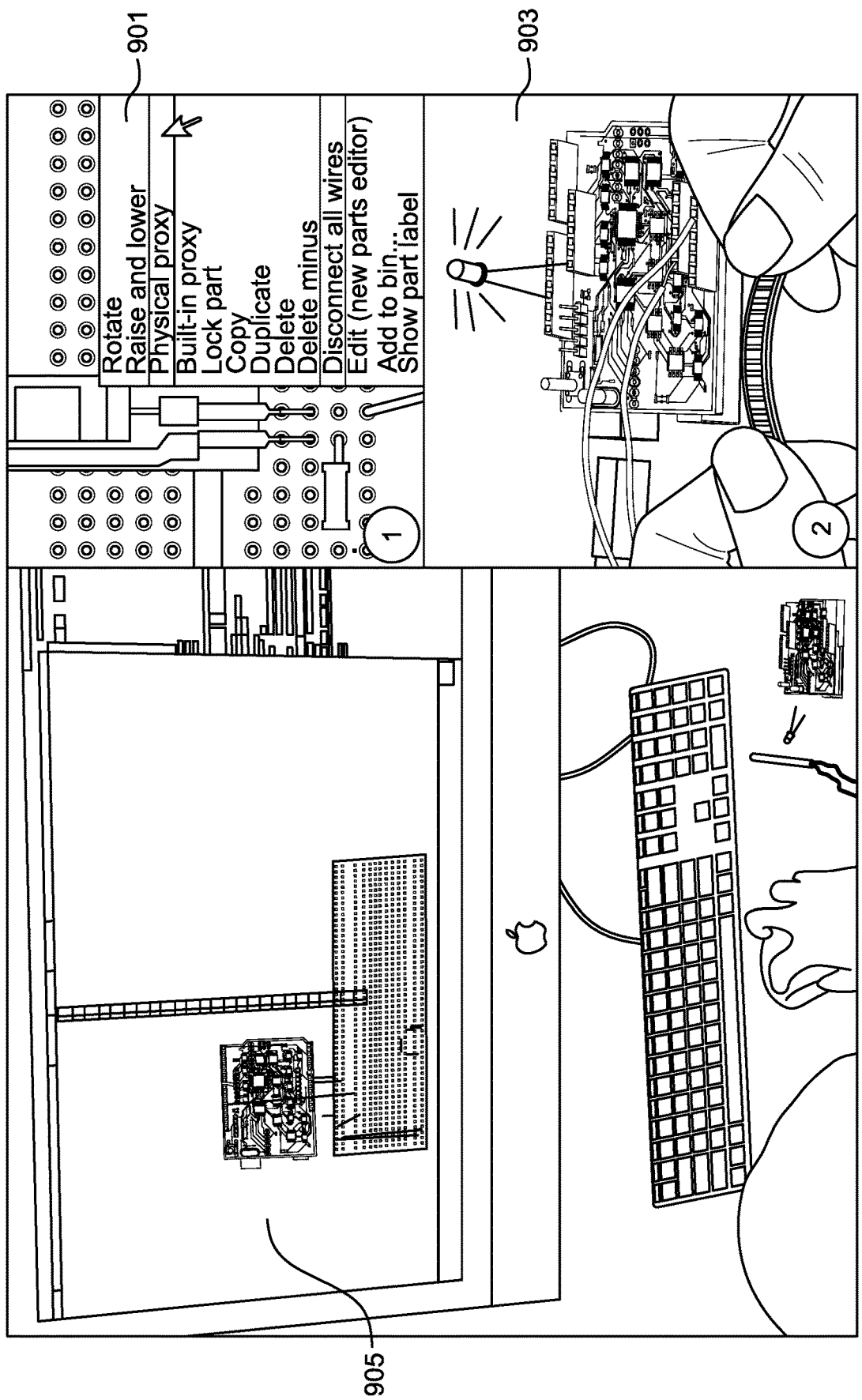
FIGS. 9A-9C illustrate in FIG. 9A interaction with virtual circuits using physical proxies (e.g. linking a virtual component to a physical flex sensor and interacting with it)
Figure 9B:
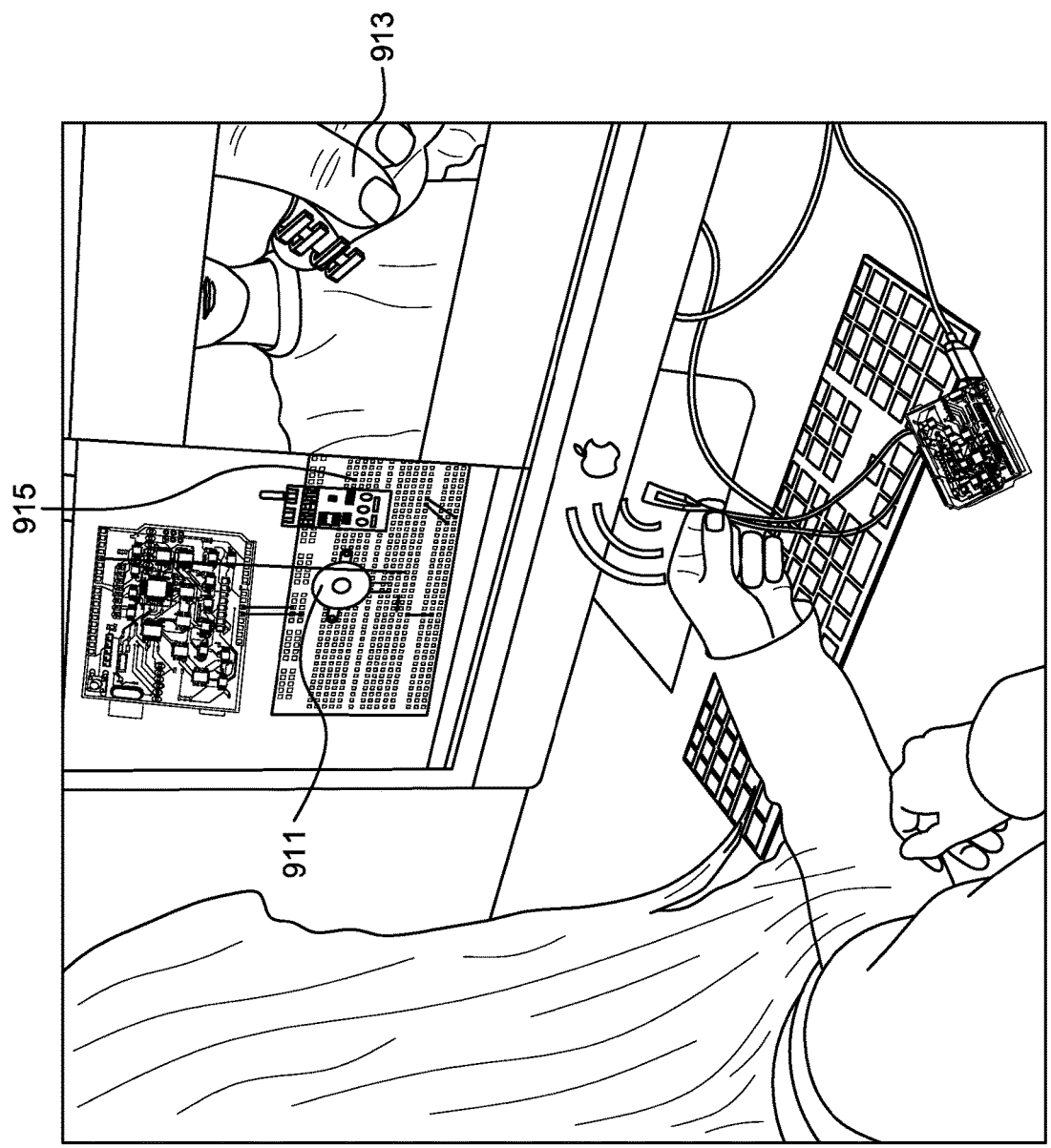
Figure 9C:
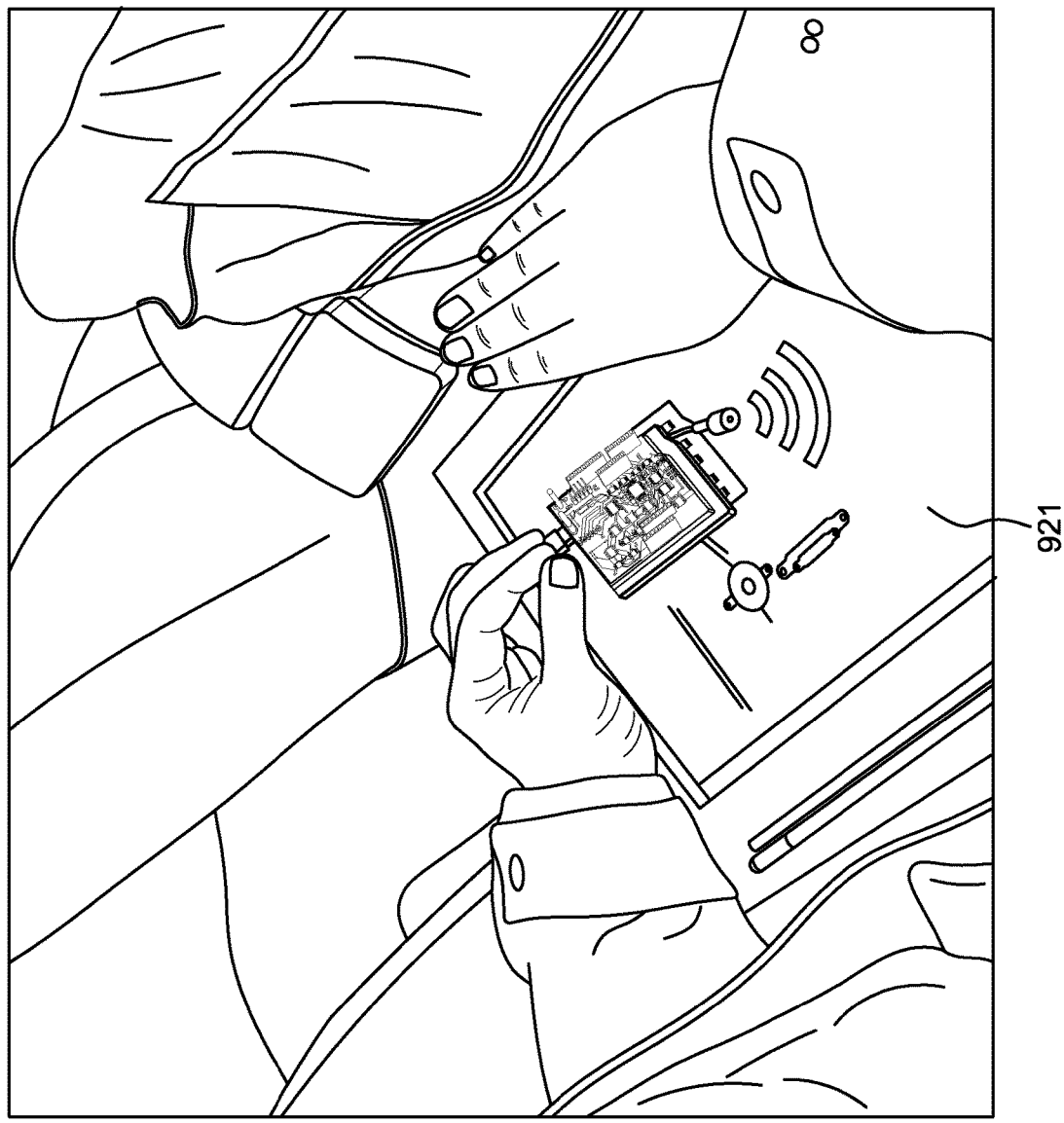

FIGS. 9A-9C illustrate some use scenarios for the broadband prototyping environment.

As illustrated in FIG. 9A, using the breadboard circuit prototyping environment, a user can interact with virtual components physically. A user interface is provided that enables users to interact with virtual circuits using physical proxies. For example, a user may link a virtual component 901 to a physical flex sensor 903 and, in 905, interact with the virtual component. By allowing users to take advantage of both the virtual and physical world, the circuit prototyping environment enables several other scenarios for novice makers, in which I/O circuits can be designed, constructed, and tested.

FIG. 9B illustrate remote collaboration and sharing a resource with others. For example, a buzzer 911 can be controlled by a remote IR transmitter and receiver 913. An example scenario is when the user is working on a project but missing a crucial I/O component to test an idea, such as a motion detector for security. Provided the circuit prototyping environment, a user can now receive help from a remote collaborator with whom they can share their virtually created circuit 915. The remote collaborator uses a real IR sensor 913 as a remote proxy of the circuit and shows the user how it functions when motion is detected. This way, the user does not need to have the sensor to test and iterate upon the idea. Essentially, it is now possible for both users to share their physical resources (e.g. sensors and actuators) using remote proxies.

FIG. 9C illustrates a case in which prototyping circuits may be ubiquitously built with build-in proxies (e.g. using built-in proximity sensor of a tablet, or other mobile device, as the physical proxy of distance sensor). For example, when a user desires to continue learning about a circuit but has no access to their breadboard or physical I/O components (e.g. they are using a tablet or mobile device on a bus ride). The user can now continue to develop the circuit on a tablet 921 and use the built-in I/O components (e.g. proximity sensor or accelerometer) of the tablet 921 as a proxy for physical interactions.

Figure 10A:
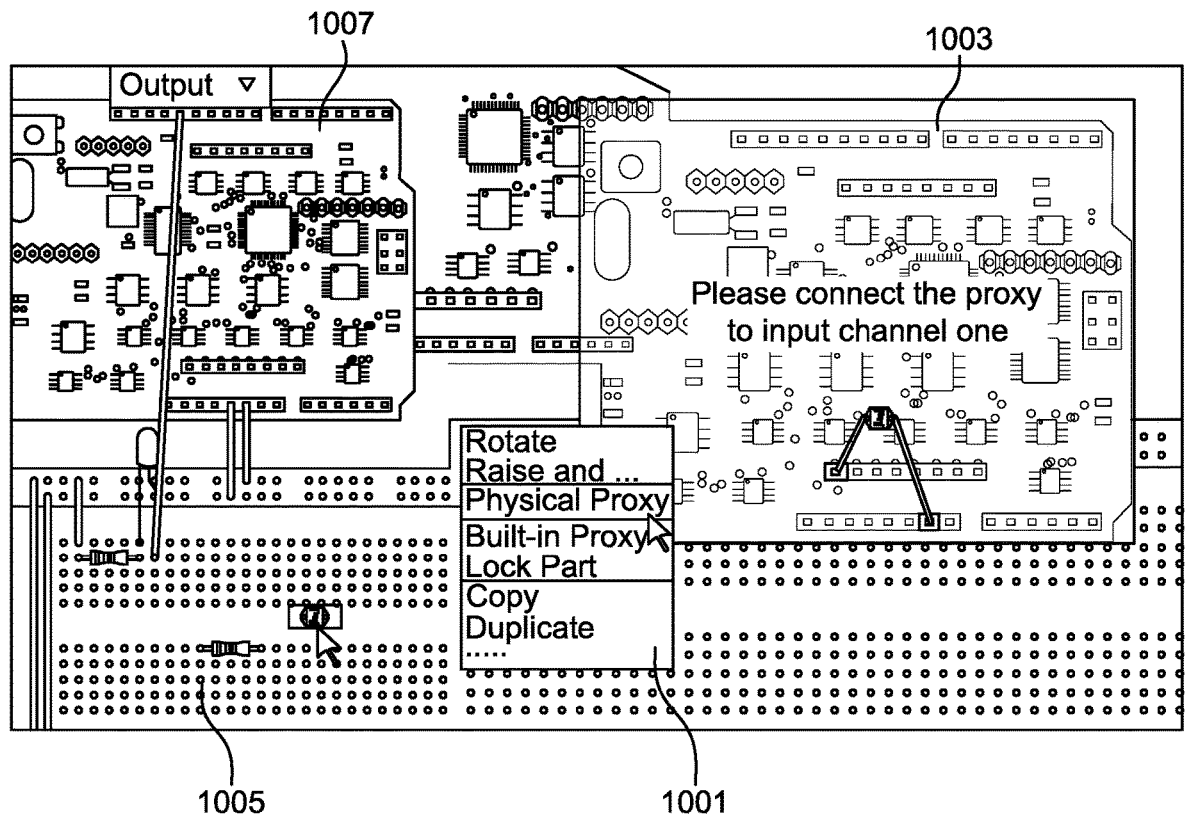
Figure 10B:
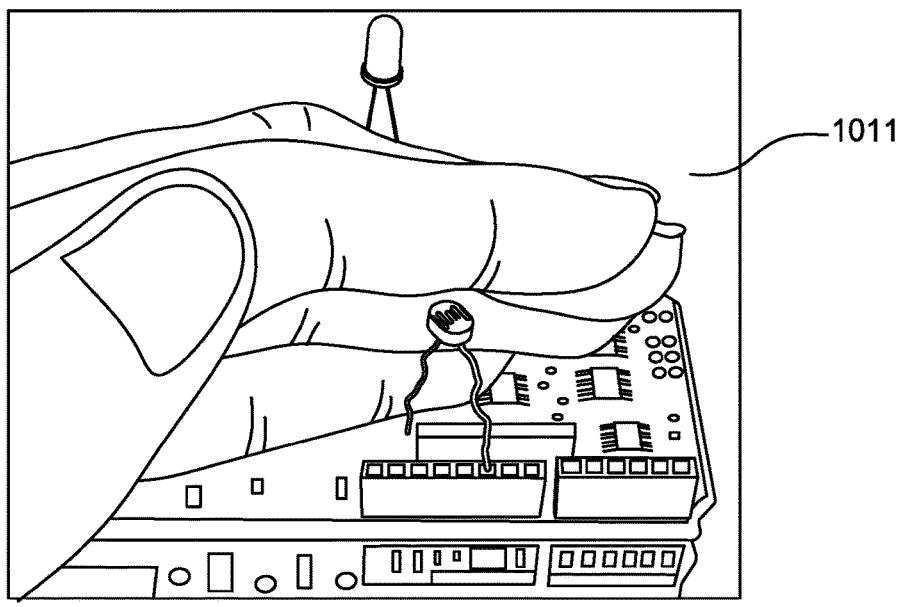
Figure 10C:
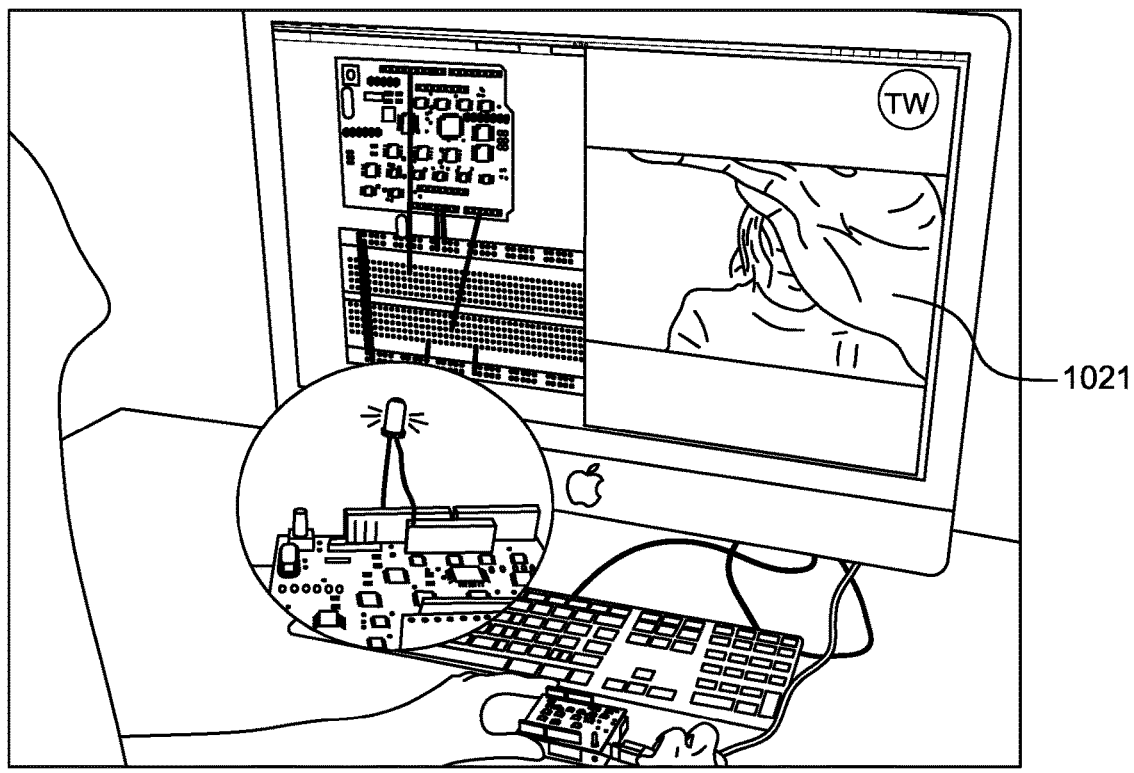
Figure 10D:
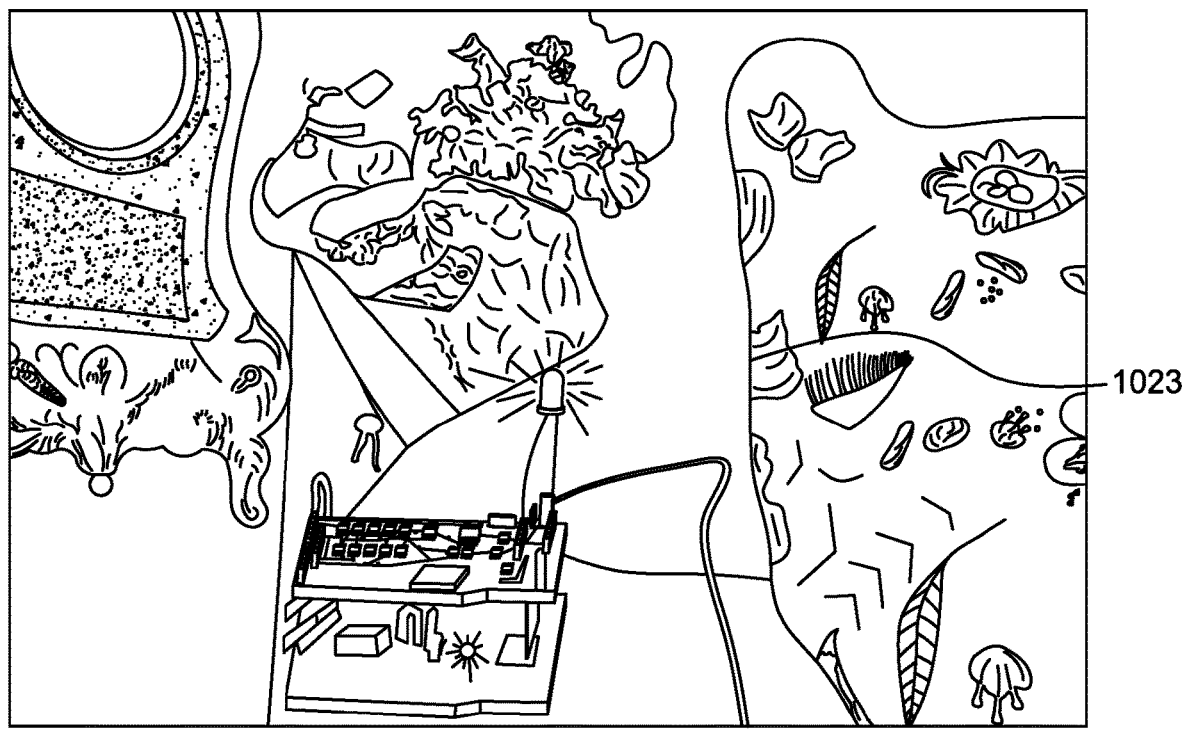

FIGS. 10A, 10B, 10C, and 10D illustrate operation of the circuit prototyping environment using an example. FIG. 10A illustrates a step in which a user designs a circuit on software and links the photoresistor as a physical proxy, where an instruction window will pop up. FIG. 10B illustrates a step in which the user can test the circuit by physically interacting with the component. FIG. 10C illustrates a step in which the user can remotely collaborate with others for help, wherein the circuit in both sides are connected and working together. FIG. 10D illustrates a step in which the circuit can be directly deployed with a WiFi module.

An example is provided to illustrate some of the capabilities of the circuit prototyping environment 100. The example is a Nightlight circuit, which uses a photoresistor to sense the intensity of room light and automatically turns on an LED if the light intensity drops below a threshold value.

Alice is a beginner, who reads an online tutorial of a Nightlight circuit and starts slowly to build it using the prototyping environment's software 601. Before she starts, she is worried because she does not have the right type of resistor. However, using the software, she is glad that it allows her to specify a resistor value virtually. She starts to drag a photoresistor, an LED, and a resistor one-by-one into the virtual breadboard 1005. She copy-and-pastes a second resistor for convenience. She sets the resistor value and connects her chosen components one by one, following the tutorial. She uses undo a few times to recover from errors. FIG. 10A illustrates a step in which a user designs a circuit on software and links the photoresistor as a physical proxy, where an instruction window 1003 will pop up.

Once the circuit is completed, Alice wants to see how it works in her room. She brings up a context menu on the software by right-clicking the virtual photoresistor. In the menu 1001, she clicks "Physical Proxy" to link the photoresistor to a physical proxy. She then follows the instructions shown in the software to connect her physical photoresistor to the desired pins on the Arduino shield 1007. She repeats the same procedure to setup the LED. Once finished, she codes in the built-in IDE by following the sample Arduino code. She clicks the "Run" button to execute the circuit in a simulator. However, the LED does not turn on when she covers the photoresistor using her hand. FIG. 10B illustrates a step 1011 in which the user can test the circuit by physically interacting with the component.

Alice calls her friend, Derek for help on Skype. Derek is an experienced maker, who accesses Alice's virtual breadboard remotely from his home computer to help her with debugging. FIG. 10C illustrates a step 1021 in which the user can remotely collaborate with others for help. The circuit in the both sides are connected and working together. The circuit seems fine when inspected, so Derek suspects that Alice's photoresistor or LED is broken. Unfortunately, Alice does not have a second photoresistor. Derek offers to try his photoresistor at his home and uses it as a remote proxy. Alice disconnects her photoresistor from the shield on her side, while Derek connects his on his side. Derek is correct. Alice's LED turns on as expected, when he covers the photoresistor.

The next day, Alice purchases a new photoresistor to replace her defective one. Just like a real breadboard circuit, she can deploy the finished project in her room. The system includes the photoresistor, LED, an Arduino and the shield. Alice further uses Arduino Uno WiFi Rev2 for the communication between the proxies and virtual circuit running on her desktop computer. Alice is happy that there is no breadboard, resistors, and messy wires in her room. FIG. 10D illustrates a step 1023 in which the circuit can be directly deployed with a WiFi module.

Example Applications

Applications have been implemented to demonstrate each point in the proxy application space through three areas.

Circuit Prototyping Using Software and Physical Proxy

Physical Input and Output Components (A1, A2)

One of the most useful use cases of the circuit prototyping environment 100 is to create the virtual circuit in software and use physical proxies for input and output. Not only does this allow a user to interact with the circuit physically, it also prevents the user from maintaining a large inventory of basic components and ICs in order to learn, practice, and prototype breadboard circuits. Additionally, hardware errors, such as lose cabling can be largely avoided by using the software. All of these can potentially make breadboard circuit prototyping more accessible to the novice users. The example with Alice shown earlier demonstrates a use case of this scenario.

Virtual Input Component and Physical Output Component (A1)

Figure 11A:
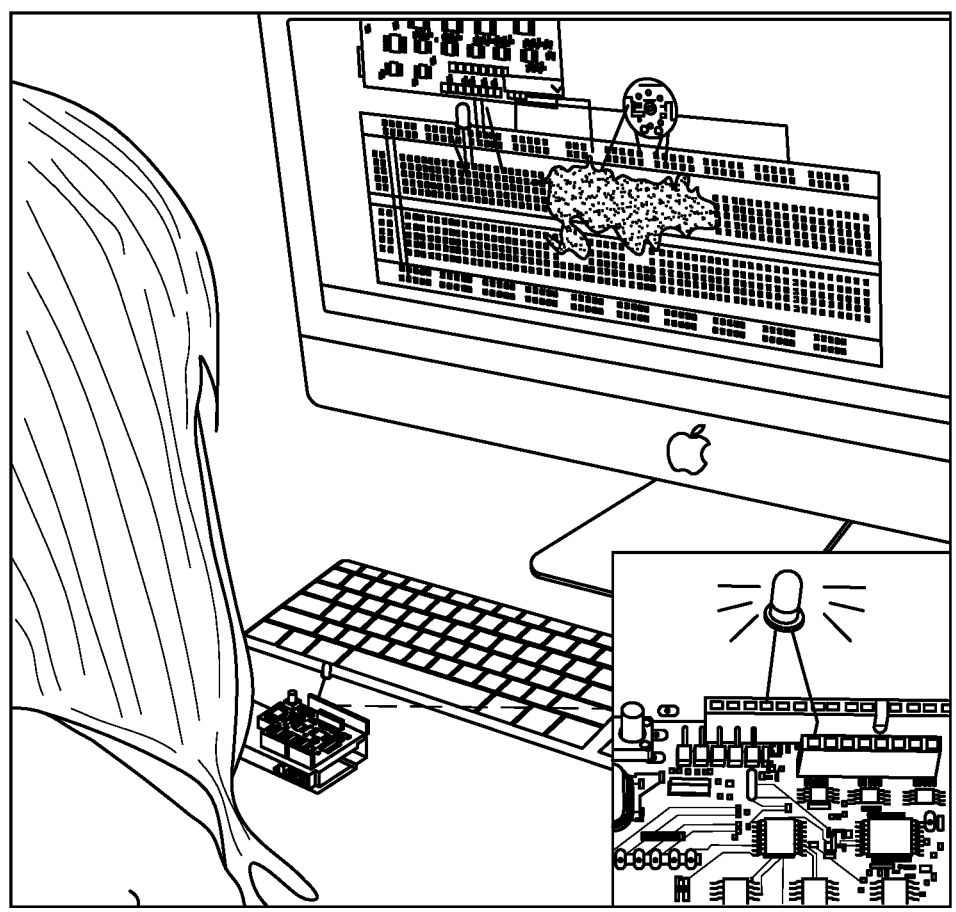
FIGS. 11A and 11B illustrate exemplary applications in which, in FIG. 11A a user drags virtual gas to adjust the value of a gas sensor to test if it works with a physical led; and in FIG. 11B, a user tests how well the light flicker detector works at a remote collaborator's home.

The flexibility of what can be used as a proxy satisfies varying needs for users. If Alice wants to modify her project to be a smoke detector, she can try her new idea by replacing the photoresistor with a gas sensor in the software and adjust the sensor value virtually to see if it works with her current circuit and LED. This way, she does not need to buy the sensor first before she can test out her idea. In FIG. 11A a user drags virtual gas to adjust the value of a gas sensor to test if it works with a physical led.

Physical Input Component and Virtual Output Component (A1)

Alice likes the idea of the smoke detector, but after she purchases the gas sensor, she figures that she wants more than just an LED. She tries out different output components in the software and finds that the buzzer, which makes a noise through her computer's speaker as an alert, is a better option for her instead.

Remote Collaboration and Resource Sharing (A3)

Figure 11B:
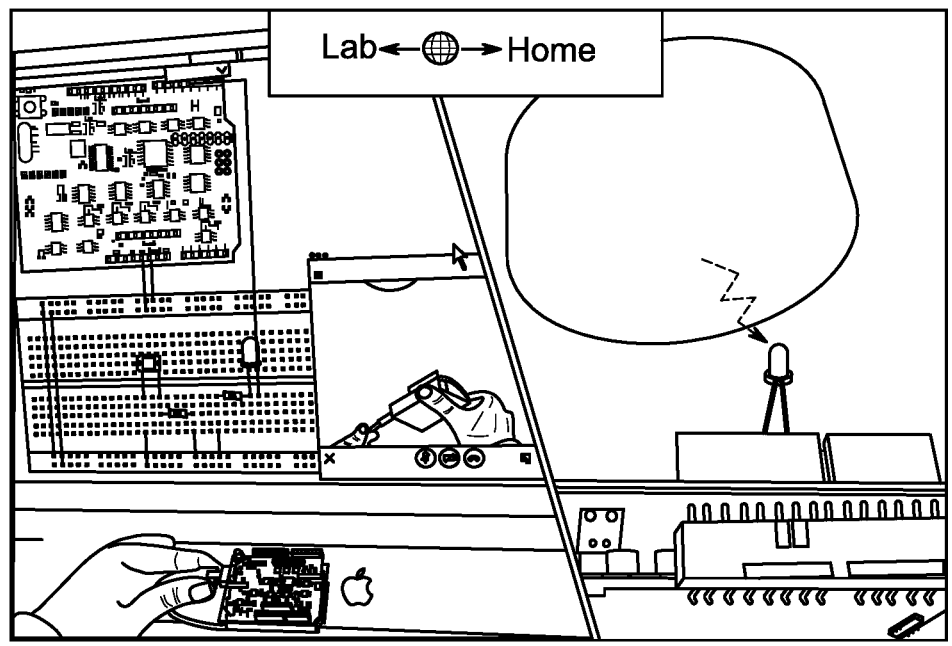

Using the software allows two remote users to collaborate on a project via a shared virtual breadboard. With the physical proxy, the benefit of the circuit prototyping environment goes beyond remote collaboration because the users now have a shared access to distributed physical resources, such as I/O component and environment only available in a remote site. In the scenario with Alice, she does not have to travel to Derek's home to use the photoresistor. It is also possible for the users to access the physical environment of a remote site. For example, a user can test how well his/her light flicker detector work in a remote collaborator's home by having a photodiode on the collaborator's side as a proxy without having to travel to a location with a flickering ceiling light. FIG. 11B a user tests how well the light flicker detector works at a remote collaborator's home.

Ubiquitous Circuit Prototyping (A4)

With the circuit prototyping environment, circuit prototyping is more accessible in mobile scenarios as a user only needs to carry the hardware and I/O components. A circuit can be designed on a tablet. This way the user can try their ideas anywhere, and it can be useful for test the projects in the real environments, where the circuits will be deployed.

In many situations, the built-in I/O devices in mobile devices may also be enough for quickly testing ideas when inspiration strikes. This way, the proxy is not in its regular form, allowing further reduction of the need to carry I/O components. For example, the user can use the built-in proximity sensor of the tablet as a proxy to simulate a HC-SR04 ultrasonic distance sensor and quickly test an idea similar to the Distance Alarm System where a buzzer rings upon the user's hand covering the sensor. See Arduino Distance Alarm. create.arduino.cc/projecthub/darwindelacruz/distance-alarm-system-0ed9e5?ref=search&ref id=distance%20sensor&offset=2. Accessed in 2019, incorporated herein by reference in its entirety. A remote collaborator in a stationary environment can take the lead on typing Arduino code because doing so on a mobile device can be challenging.

System Evaluation

The circuit prototyping environment of the present disclosure was evaluated. The circuit prototyping environment was also referred to as Proxino. The evaluation was performed by measuring the difference between the output of the environment versus that of a real circuit. The evaluation included four common analog input signals that included resistance, capacitance, voltage, and switch status. The evaluation also tested the PWM output of the environment with and without being processed by an IC (e.g., a motor driver).

Analog Input Circuits

Tested circuits are described for the 4 analog input signals:

Resistance: Comprised of the potentiometer and a resistor of 10K $\Omega$ connected in series. Examining the Arduino Starter Kit, it was found that this setup is representative of circuits for commonly used input components based on resistance, such as the photoresistor, the flex resistor, the force sensor, or the slide potentiometer. See Arduino Starter Kit. store.arduino.cc/usa/arduino-starter-kit. Accessed in 2019, incorporated herein by reference in its entirety. A digital potentiometer was used to produce different levels of input resistance.

Voltage: Comprised of a function generator and a resistor of 100K $\Omega$ connected in series. This setup can also be found for many of the common input components based on voltage, including the temperature sensor, the proximity infrared sensor, and a piezo sensor. A function generator was used to produce input voltages of varying amounts.

Capacitance: Includes a variable capacitor and a resistor of 1M $\Omega$ connected in series. This setup represents a circuit typically used for capacitive sensing. A variable capacitor was used to produce different levels of capacitance.

Switch: Comprised of a push button and a 1K $\Omega$ resistor connected in series.

Analog Output Circuits

The PWM output of the environment was compared with the original output from an Arduino UNO. The PWM signals of different duty cycles were generated in a circuit containing a resistor of 100$\Omega$ connected with an LED in series. Aside from the LED itself, this type of circuit is commonly seen in many other entry level projects to drive output components, like a buzzer, or a vibration motor. Additionally, the experiment included another common type of circuit composed of an output component and an IC, and used a PNP transistor to drive a DC Hobby Motor 130.

Data Collection

Data collection for both input and output was carried out using the tested circuits on a real breadboard with an Arduino Uno, and also on a virtual breadboard with the circuit prototyping environment, where the behaviors of the circuits were simulated.

Input

For input, the ground truth data includes the resistance values ranging from 100$\Omega$ to 100K $\Omega$ with an interval of 1024$\Omega$, voltage values ranging from 0 V to 5 V with an interval of 100 mV, and capacitance values ranging from 100 p to 470 p with an interval of 4 p. The switch status was produced by clicking the push button 10 times. The evaluation also included in the ground truth, the corresponding return values from Arduino's analogRead( ) based on the physical circuits. Note that Arduino's capacitance readings were recorded using Arduino's Capacitive Sensing Library.

See Arduino Capacitive Sensing Library. playground.arduino.cc/Main/CapacitiveSensor. Accessed in 2019, incorporated herein by reference in its entirety.

For the testing data, the evaluation recorded the actual resistance, voltage, capacitance, and switch status measured by the shield. We also recorded the corresponding return values for analogRead( ) calculated by the simulator based on the virtual representation of the tested circuit. The evaluation provided information on how the value of analogRead( ) generated by the circuit prototyping environment and Arduino UNO differ comparatively.

Output

For the ground truth data, 500 Hz PWM signals were generated ranging from 0 to 100% duty cycles at a 4% interval using Arduino's analogWrite( ). Next, the corresponding PWM at the output pins of the Arduino UNO was recorded as ground truth for the tested circuits.

For the testing data, the PWM signals calculated by the simulator were recorded before the signals were passed to the shield. Additionally, the evaluation recorded the corresponding PWM signals captured at the output pins of the shield. The evaluation provided information as to how the output PWM signals generated by the simulator differ from the real ones, and how the output PWM captured at the shield differ from the real ones. The PWM signals were compared by their duty cycle and amplitude.

Result

Analog Input

The left column of Table 1 shows the measurement error of Proxino's shield versus the ground truth. Additionally, the mean difference in the return value of analogRead( ) calculated by the circuit prototyping environment versus that of a real circuit using the Arduino UNO are reported.

For the resistance, the measurement error of our shield was 5.92%. This is acceptable as it is close to a resistor's 5% tolerance range. The value of analogRead( ) generated by Proxino and Arduino UNO differed by 17 units. This difference was mainly caused by the measurement error from both Arduino UNO and our shield.

The measurement error of our shield in capacitance was 12.9%, which is again acceptable as it is within the 20% tolerance range of the capacitor. This amount of error could be negligible for capacitive sensing. The average return value of the circuit prototyping environment and Arduino's touch library differed by 1082 units out of a total range of 65535 units. In turn, the return value of analogRead( ) generated by the circuit prototyping environment and Arduino UNO is deferred by 6 and 3 units respectively. These differences can be negligible for many of the entry level applications and circuits for novice makers.

TABLE 1

Error rate of Proxino and difference in the return value of analogRead( ) calculated by Proxino versus the Arduino Uno.

| Input Type | Error (%) | Avg. diff in Input Value |
| --- | --- | --- |
| Resistance | 5.9% | 17 (0-1204) |
| Capacitance | 12.9% | 1082 (0-65535) |
| Voltage | 2.4% | 6 (0-1024) |
| Switch | 0% | 3 (0-1024) |

Analog Output

Table 2 summarizes the difference between the PWM signals of an Arduino UNO and those calculated by the simulator or captured at the shield. In general, the difference between the real and simulated signals are relatively small. The shield was also able to preserve the signals from the simulator with a small amount of error in both duty cycle and amplitude. Overall, it is expected that this amount of system errors would not significantly impact user experience in prototyping entry level circuits.

The data transmission rate and the delay caused by data transmission and simulation were measured. The data transmission rate of the circuit prototyping environment was 3 k/s, which in this implementation was bound to the serial port communication between the shield and Arduino. The delay caused by data transmission was 5 ms between the shield and software running on a 2015 iMac. The delay caused by the circuit simulation was measured at 19 ms and 11 ms for the LED and motor circuit respectively. It is expected that the delay to increase with the increase of circuit complexity and network traffic.

TABLE 2

Difference in the duty cycle and peak value of the PWM signal per tested circuit.

| | Diff. in PWM Duty Cycle | | Diff. in PWM Amplitude | |
| --- | --- | --- | --- | --- |
| Circuit | Simulator | Shield | Simulator | Shield |
| LED | 0.9% | 1.2% | 49 mV | 55 mV |
| Motor | 1.3% | 1.7% | 200 mV | 208 mV |

Informal User Evaluation

To solicit initial user feedback of the circuit prototyping environment, an informal user study was conducted by asking participants to create the Nightlight circuit in (1) a desktop environment, (2) a mobile environment, and (3) with a remote collaborator.

Participants

Nine participants (3 female) between the ages of 18 and 26 participated in the study. All were novice makers with limited experiences in prototyping breadboard circuits.

Apparatus

The study apparatus included the circuit prototyping environment along with an LED and photoresistor, serving as proxies. Participants created the circuit on a Lenovo Yoga X laptop, which was switched to tablet mode in a mobile condition in a car. The built-in ambient light sensor of the laptop was used as the proxy of the photoresistor in the mobile condition. Participants used Skype to communicate with the collaborator in the remote collaboration condition.

Task and Procedure

Figure 12B:
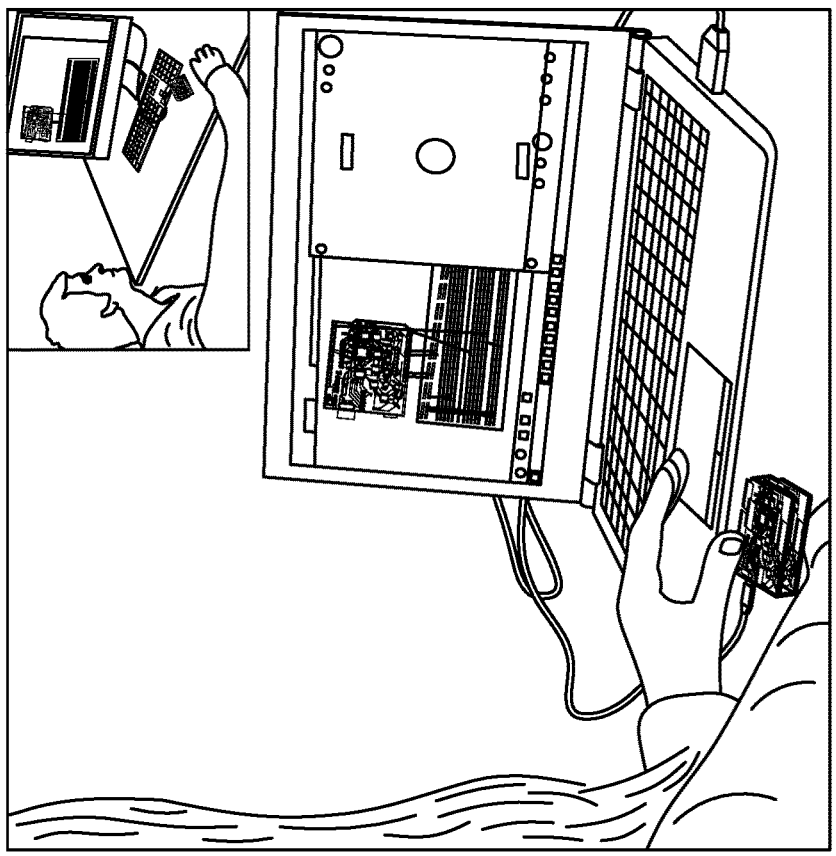
FIGS. 12A, 12B, and 12C illustrate three conditions of the informal study, in which in FIG. 12A, a study is performed on a desk in an office.
Figure 12A:
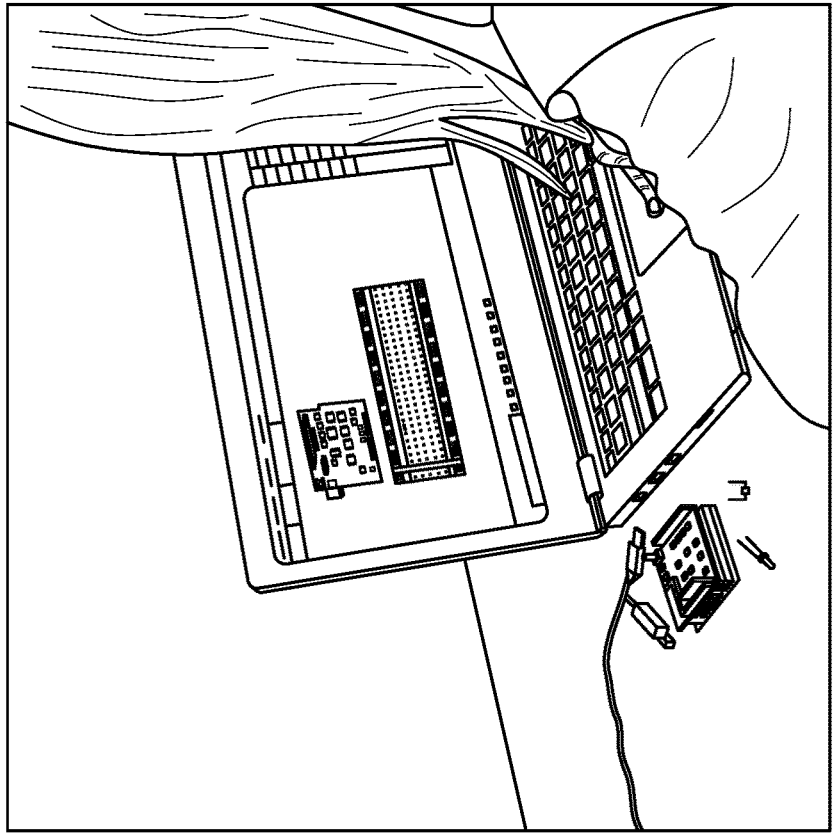
Figure 12C:

Participants were then asked to construct the Nightlight circuit using the circuit prototyping environment in three conditions: (1) on a desk in an office alone, (2) on the desk working with an expert collaborator from a remote site, and (3) as a passenger in a car. FIGS. 12A, 12B, 12C illustrate three conditions of the informal study in which in FIG. 12A a study is performed on a desk in an office; in FIG. 12B a study is performed on the desk working with an expert collaborator from a remote site; in FIG. 12C a study is performed while a passenger is in a car. In all conditions, participants created the circuit using the software and were encouraged to try the LED and photoresistor as proxies. In the remote collaboration condition, participants constructed the circuit together with a collaborator (with 5-years of circuit prototyping experience) and were encouraged to try the proxies on both sides. In the mobile condition, participants were given the laptop in tablet mode and were encouraged to use the device's ambient light sensor as a proxy for the photoresistor. Note that readings from the tablet's ambient light sensor given from the Windows Sensor API is converted into the resistance value of the photoresistor (proxy) based on its datasheet, which is then treated as input data from the proxy. Thus, the behavior of the built-in ambient light sensor is the same as the photoresistor. The three conditions were counterbalanced among participants. After the study, participants reflected on their experience of using the prototyping environment, the three scenarios, and how their experience differed from using only software or a physical breadboard.

Result

All participants completed the nightlight prototype successfully in all three conditions. Through the interviews, we were able better understand their experiences and identify potential usability issues in our current implementation.

From a software perspective, participants stated that circuit prototyping using the prototyping environment's software allowed them to construct and test their circuits quicker and less error-prone than using a physical breadboard. From the hardware perspective, participants mentioned that the most enjoyable feature of the circuit prototyping environment was that they were able to use much fewer physical components and jumper wires to construct the same circuit while still being able to interact with it physically. This allowed our participants to be more focused on the design of circuit functions rather than cumbersome logistics, such as cutting wires or fixing loose pin connections.

For example, a participant indicated that "When I work on a real breadboard, I usually have to spend much of my time cutting wires into proper lengths or identifying the right type of resistors or other components. This is tedious. But Proxino allowed me to focus more on getting the right design of my circuit functions. For example, I had more time to try out resistors of different values. I knew I could use software before, but it was not a true option because I was unable to test my circuit real. Proxino gave me the best from both sides and I think it is really amazing." (P2).

The study results also provided useful insights into the usability issues that are uniquely related to the introduction of a physical proxy into software circuit prototyping processes. For example, debugging a virtual circuit could now be more complicated in a blended physical and virtual environment. A participant indicated that "it was difficult for me to locate a problem I had because I was unsure about whether the cause was a defective photoresistor or LED, or something went wrong in my circuit" (P1 and P5). It is believed that a better design in this case is to program the virtual photoresistor or LED to react upon the function of the circuit, even if a proxy was not used. However, in a broader sense, debugging tools combining both hardware and software, such as ToastBoard and CurrentViz, should be considered as a part of the circuit prototyping environment to allow users to better understand how the virtual and physical components work together in their prototyped circuit. See Johnson A Asumadu, R Tanner, J Fitzmaurice, M Kelly, H Ogunleye, J Belter and Song Chin Koh. 2003. A Web-based hands-on real-time electrical and electronics remote wiring and measurement laboratory (RwmLAB) instrument. In *Proceedings of the* 20*th IEEE Instrumentation Technology Conference* (Cat. No. 03CH37412), IEEE, 1032-1035. DOI: doi.org/10.1109/IMTC.2003.1207909; and Nuno Sousa, Gustavo R Alves and Manuel G Gericota. 2010. An integrated reusable remote laboratory to complement electronics teaching. IEEE Transactions on learning technologies. 265-271. DOI: doi.org/10.1109/TLT.2009.51, each incorporated herein by reference in their entirety.

In the remote collaboration condition, participants stated they were excited that "collaborating on a physical circuit now becomes possible" (P2, P3, P4, P5, and P7) and about "what the remote component can bring to the table" (P1, P5 and P7). What is missing in the current implementation but can be improved in the future is to allow collaborators to maintain a constant awareness of the status of the remote proxy. For example, participants stated "I could not always see my collaborator's LED or how they interactive with the photoresistor" (P1). "Sometimes I do not feel that I have enough control over the remote proxy" (P7). This indicates an interesting direction for future research as the issues of remote awareness in a broader sense is an open problem in CSCW and now the collaborative circuit prototyping and physical proxy have brought forth new challenges to solve.

In the mobile condition, all of the participants stated they saw themselves prototyping a circuit in mobile scenarios. They found it handy to use the tablet's built-in sensors as a proxy. For example, a participant said "I like the idea of using the built-in sensor as a proxy. Now I can simply take my circuit with me and show it to my colleagues on a different floor without having to carry the photoresistor and Proxino device" (P1). Participants commented that "I do have new ideas from time to time especially during my bus ride to school, this tool is helpful in the sense that I can test my idea anywhere I want" (P4, P7). The same group of participants told us that they hoped "my device can have more of such built-in proxies" (P4, P7). It is not surprising that the existence of the I/O device in a mobile device limits what the users can do in mobile without bringing the proxies. A participant (P7) was concerned about the mobile device's built-in sensors may not behavior the same way as the physical component, and that they may have to change their Arduino code (e.g., threshold value) when switching back to a real component. A solution to mitigate this problem is to calibrate the behavior of components in software. In a previous example with Alice, the output readings of the ambient light sensor of the tablet and that of the photoresistor can be calibrated to match each other.

Alternative Embodiments

Numerous modifications and variations of the present invention are possible in light of the above teachings. It is therefore to be understood that within the scope of the appended claims, the invention may be practiced otherwise than as specifically described herein.

For example, a kernel can be implemented using a first option that is similar to the approach described in Virtual-Component, where the system employs a pre-defined set of physical components preinstalled for future use. The benefit of this approach is clear, as the constructed circuits behave as though they are real. However, the drawbacks appear to outweigh the benefits. For example, the system can fail to work if a required component is unavailable. Additionally, maintaining a library of extra components increases the size of the device, making it inconvenient in mobile situations. Finally, when deploying a completed circuit, it can be challenging for a user who will have to give up the entire preinstalled package.

These problems can be mitigated to some extent by using a centralized resource management approach like those used in remote electronics laboratories, but managing such a system can be pricey. See Johnson A Asumadu, R Tanner, J Fitzmaurice, M Kelly. H Ogunleye, J Belter and Song Chin Koh. 2003. A Web-based hands-on real-time electrical and electronics remote wiring and measurement laboratory (RwmLAB) instrument. In *Proceedings of the 20th IEEE Instrumentation Technology Conference* (Cat. No. 03CH37412), IEEE, 1032-1035. DOI: doi.org/10.1109/IMTC.2003.1207909; Ingvar Gustavsson, Thomas Olsson, Henrik Akesson, Johan Zackrisson and Lars Hakansson. 2005. A remote electronics laboratory for physical experiments using virtual breadboards. In *Proceedings of the 2005 ASEE Annual Conference,* 12-15; Nuno Sousa, Gustavo R Alves and Manuel G Gericota. 2010. An integrated reusable remote laboratory to complement electronics teaching. IEEE Transactions on learning technologies. 265-271. DOI: doi.org/10.1109/TLT.2009.51, each incorporated herein by reference in their entirety.

A second approach uses software to simulate circuit behavior. Software simulation is already widely used in industry and can be very precise in reproducing circuit behaviors. However, the challenge is software cannot completely replicate the real world. Phenomenon such as environmental noises or conditions cannot be fully reproduced by the software. This approach may be not a significant drawback for a system designed for novice makers. However, in some cases computational delay can be an issue for real-time circuit execution. Therefore, circuits need to be computationally "light" at present, but this issue may be solved with faster computers. In general, using a simulator has benefits in scalability, portability, and deployability in comparison to the first approach.

The hardware can be implemented to support applications that require high-frequency signals, such as antennas or microphones. A hardware platform may be implemented using an Arduino Mega, or using a different data transformation method to directly communicate with PC, such as USB or WiFi.

A hardware implementation of the data acquisition and proxy driver circuit functions may be provided to support components that require precise measurements of the input voltage signal (e.g., a strain gauge). The functions can be provided on a circuit board that uses specific circuits, such as a Wheatstone bridge circuit or differential amplifier circuit, to amplify the input signal. Further, the hardware implementation can be configured to support components that require a current larger than 500 mA (e.g., some models of servos, DC motors, solenoids, speakers). The circuit board may be configured in a compact size.

Finally, circuit prototype environment can support basic components (e.g., resistors) or ICs to be used as a physical proxy. Using these basic components as a physical proxy enables many applications, especially for educational purposes. For example, the basic components might be needed by a novice user to learn how to create and fine-tum a real amplifier circuit in a noisy real-world environment.

Mobile and remote collaboration has a great potential to improve the experience of circuit prototyping by changing the way how breadboard circuits are constructed, tested, and shared among the users. An aspect is to integrate a video conference system into the circuit prototyping environment's software so that the users will not have to frequently switch between the breadboard view and camera view. In this disclosure, a circuit prototyping environment is disclosed that allows users to extend a virtual circuit to the physical world using proxies. The disclosure describes the usability of physical proxies and a system. The system includes software, which has a frontend interface and a backend server, and hardware, in the form of an Arduino shield. To demonstrate the disclosed approach and its benefits for novice makers, several applications have been implemented such as remote collaboration and ubiquitous circuit prototyping. Finally, through a system evaluation and informal user study for initial feedback, the effectiveness of using physical proxies for virtual circuits is demonstrated.

The invention claimed is:

1. A circuit prototyping system, comprising:
    a hardware interface module configured to electronically connect to a physical electronic device;
    a virtual circuit design interface to construct a virtual circuit having a plurality of virtual circuit devices including a virtual counterpart of the physical electronic device; and
    a circuit simulator configured to simulate the virtual circuit including communicating data with the physical electronic device by communicating with the hardware interface module.

2. The circuit prototyping system of claim 1, further comprising another hardware interface module,
    wherein the another hardware interface module is configured to electronically connect to another physical electronic device, and
    the another hardware interface module is in communication with the circuit simulator.

3. The circuit prototyping system of claim 2, wherein the hardware interface module is located at a first location, and the another hardware interface module is located at a second location that is remote from the first location.

4. The circuit prototyping system of claim 1, further comprising a server including processing circuitry configured to execute the circuit simulator and synchronize data transmission between the circuit simulator and the hardware interface module.

5. The circuit prototyping system of claim 4, wherein the circuit simulator is configured to simulate a virtual breadboard having the virtual circuit.

6. The circuit prototyping system of claim 4, wherein the server is further configured to
    control interactions between a remote virtual circuit design interface and a remote electronic device, including making modifications to the virtual circuit,
    communicate changes on the virtual circuit to the circuit simulator, and
    report the changes to the remote virtual circuit design interface.

7. The circuit prototyping system of claim 1, wherein
    the hardware interface module includes a data acquisition circuit, and
    the data acquisition circuit is configured to perform signal conversion for input from the physical electronic device, when the physical electronic device is an input device.

8. The circuit prototyping system of claim 7, wherein the data acquisition circuit is configured as a voltage divider, resistance-capacitance circuit, or a pull-down circuit such that the hardware interface module measures input voltage, resistance, capacitance, or switch status of the physical electronic device.

9. The circuit prototyping system of claim 1, wherein
    the hardware interface module includes an electronic device driver circuit, and
    the electronic device driver circuit is configured to perform signal conversion for output to the physical electronic device, when the physical electronic device is an output device.

10. The circuit prototyping system of claim 9, wherein the electronic device driver circuit generates pulse width modulation signals to drive the physical electronic device.

11. The circuit prototyping system of claim 1, wherein a virtual electronic device of the plurality of virtual circuit devices is simulated by the circuit simulator using a mathematical model.

12. The circuit prototyping system of claim 1, wherein the virtual circuit design interface is an interface for interacting with the virtual circuit, which includes the virtual counterpart.

13. The circuit prototyping system of claim 1, wherein the virtual circuit design interface includes a function to assist linking of the virtual counterpart with the physical electronic device.

14. The circuit prototyping system of claim 13, wherein the physical electronic device is a built-in sensor component of a mobile device.

15. The circuit prototyping system claim 1, further comprising a hardware interface program that when executed by a processor of the hardware interface module accommodates for differences in execution speed between the circuit simulator and the hardware interface module.

16. The circuit prototyping system of claim 1, further comprising a local computer device having the virtual circuit design interface, wherein the physical electronic device and the hardware interface module are located at a remote location from the local computer device.

17. An interface board for interfacing between a virtual circuit executed by a circuit simulator and a physical electronic device, the physical electronic device being one of an input physical electronic device and an output physical electronic device, the interface board comprising:

a data acquisition circuit configured to operate as one or more of a voltage divider, a resistance-capacitance circuit, and a pull-down circuit, depending on a type of the input physical electronic device when the physical electronic device is the input physical electronic device;

a driver circuit configured to generate pulse width modulation signals to drive different types of the output physical electronic device when the physical electronic device is the output physical electronic device, and a hardware interface program which, when executed by processing circuitry of the interface board, receives input data from the input physical electronic device or sends output data to the output physical electronic device, and communicates the input data or the output data with the circuit simulator while executing the virtual circuit.

18. The interface board of claim 17, wherein the data acquisition circuit comprises a potentiometer configured to function as a voltage divider.

19. The interface board of claim 17, wherein the hardware interface program pauses its execution after measuring an input from the input physical device for a time period based on a time to calculate the input by the circuit simulator.

20. The interface board of claim 17, wherein the physical input device is a physical proxy of a virtual counterpart, and
the virtual counterpart is a component of the virtual circuit.

* * * * *